(12) United States Patent
Lin et al.

(10) Patent No.: US 7,870,066 B2
(45) Date of Patent: Jan. 11, 2011

(54) AUTOMATIC DISPUTE RESOLUTION

(75) Inventors: Huey Lin, Moutain View, CA (US);
Max Levchin, Palo Alto, CA (US); Gina Han, Sunnyvale, CA (US); Theodore Douglas LeVan, San Francisco, CA (US); Dan Levy, San Francisco, CA (US); Chris McGraw, Sunnyvale, CA (US); Erik Klein, Sunnyvale, CA (US); Greg Cervelli, San Jose, CA (US); Steven Wo, San Jose, CA (US); Carl Freeland, Palo Alto, CA (US); May Chen, San Jose, CA (US); Kristen Wilson, Mountain View, CA (US); Jason Nielsen, Omaha, NE (US); Kyle Haffey, Omaha, NE (US); Julie Gonzales, Omaha, NE (US); Denise Aptekar, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 1213 days.

(21) Appl. No.: 10/837,224

(22) Filed: Apr. 30, 2004

(65) Prior Publication Data
US 2005/0125340 A1    Jun. 9, 2005

Related U.S. Application Data

(60) Provisional application No. 60/476,784, filed on Jun. 6, 2003.

(51) Int. Cl.
*G06Q 40/00* (2006.01)

(52) U.S. Cl. .......................................... 705/39; 705/40
(58) Field of Classification Search .............. 705/39–42
See application file for complete search history.

(56) References Cited

U.S. PATENT DOCUMENTS

| 5,794,219 A | 8/1998 | Brown |
| 5,835,896 A | 11/1998 | Fisher et al. |
| 5,878,139 A | 3/1999 | Rosen |
| 5,895,450 A | 4/1999 | Sloo |

(Continued)

FOREIGN PATENT DOCUMENTS

WO   WO-2004111774 A2   12/2004

(Continued)

OTHER PUBLICATIONS

"International Search Report, Application No. PCT/USO4/17641, date mailed Mar. 28, 2005", 10 Pages.

(Continued)

*Primary Examiner*—Hani Kazimi
(74) *Attorney, Agent, or Firm*—Schwegman, Lundberg & Woessner, P.A.

(57) ABSTRACT

A method and system for resolving disputes between parties involved in a network-based transaction is described. One aspect of the present invention seeks to automatically facilitate the restitution of value to parties of the transaction, for example, facilitated by a network-based commerce platform or involving a network-based payment service, where a dispute has arisen with respect to the transaction.

36 Claims, 37 Drawing Sheets

U.S. PATENT DOCUMENTS

| | | | |
|---|---|---|---|
| 6,336,095 | B1 | 1/2002 | Rosen |
| 6,415,264 | B1 | 7/2002 | Walker et al. |
| 6,535,856 | B1 | 3/2003 | Tal |
| 6,587,838 | B1 | 7/2003 | Esposito et al. |
| 6,598,026 | B1 | 7/2003 | Ojha et al. |
| 6,766,307 | B1 | 7/2004 | Israel et al. |
| 6,850,918 | B1 | 2/2005 | Burchetta et al. |
| 6,856,984 | B2 | 2/2005 | Slaikeu |
| 6,954,741 | B1 | 10/2005 | Burchetta et al. |
| 7,020,634 | B2 | 3/2006 | Khaishgi et al. |
| 2001/0034635 | A1 | 10/2001 | Winters |
| 2001/0041993 | A1 | 11/2001 | Campbell |
| 2001/0047332 | A1 | 11/2001 | Gonen-Friedman et al. |
| 2001/0053967 | A1 | 12/2001 | Gordon et al. |
| 2002/0007283 | A1 | 1/2002 | Anelli |
| 2002/0010591 | A1 | 1/2002 | Pomerance |
| 2002/0010634 | A1 | 1/2002 | Roman et al. |
| 2002/0035528 | A1 | 3/2002 | Simpson et al. |
| 2002/0059130 | A1 | 5/2002 | Cheng et al. |
| 2002/0069182 | A1 | 6/2002 | Dwyer |
| 2002/0143711 | A1 | 10/2002 | Nassiri |
| 2004/0059596 | A1 | 3/2004 | Vaidyanathan et al. |
| 2004/0128155 | A1 | 7/2004 | Vaidyanathan et al. |
| 2004/0148234 | A1 | 7/2004 | Gonen-Friedman et al. |
| 2004/0267559 | A1 | 12/2004 | Hinderer et al. |
| 2005/0246268 | A1 | 11/2005 | Foran et al. |
| 2005/0289039 | A1 | 12/2005 | Greak |
| 2006/0031177 | A1 | 2/2006 | Rule |

FOREIGN PATENT DOCUMENTS

| | | | |
|---|---|---|---|
| WO | WO-2004111774 | A3 | 12/2004 |

OTHER PUBLICATIONS

Arsenault, Lisa, "Web Wise", *Canadian Insurance*, 103(9), (Aug. 1998), 6 Pages.

Kandra, Anne, "Consumer Watch: Resolutions for Smart Buyers", *PC World magazine*, 19(1), (Jan. 2001), 27-30.

"U.S. Appl. No. 09/583,216, Advisory Action mailed Jan. 8, 2009", 3 pgs.

"U.S. Appl. No. 09/583,216, Advisory Action mailed Jan. 14, 2004", 2 pgs.

"U.S. Appl. No. 09/583,216, Advisory Action mailed Jul. 7, 2005", 4 pgs.

"U.S. Appl. No. 09/583,216, Appeal Brief filed Jul. 11, 2005", 20 pgs.

"U.S. Appl. No. 09/583,216, Final Office Action mailed Mar. 11, 2005", 7 pgs.

"U.S. Appl. No. 09/583,216, Final Office Action mailed Oct. 3, 2008", 14 pgs.

"U.S. Appl. No. 09/583,216, Final Office Action mailed Oct. 10, 2003", 14 pgs.

"U.S. Appl. No. 09/583,216, Non Final Office Action mailed May 6, 2004", 14 pgs.

"U.S. Appl. No. 09/583,216, Non-Final Office Action mailed Feb. 15, 2008", 12 pgs.

"U.S. Appl. No. 09/583,216, Non-Final Office Action mailed Apr. 17, 2009", 13 pgs.

"U.S. Appl. No. 09/583,216, Preliminary Amendment filed Oct. 31, 2007", 13 pgs.

"U.S. Appl. No. 09/583,216, Response filed May 11, 2005 to Final Office Action mailed Mar. 11, 2005", 6 pgs.

"U.S. Appl. No. 09/583,216, Response filed Jun. 16, 2008 to Non Final Office Action mailed Feb. 15, 2008", 11 pgs.

"U.S. Appl. No. 09/583,216, Response filed Jul. 14, 2003 to Non Final Office Action mailed Apr. 14, 2003", 10 pgs.

"U.S. Appl. No. 09/583,216, Response filed Nov. 8, 2004 to Non Final Office Action mailed May 6, 2004", 2 pgs.

"U.S. Appl. No. 09/583,216, Response filed Dec. 3, 2008 to Final Office Action mailed Oct. 3, 2008", 17 pgs.

"U.S. Appl. No. 09/711,578, Appeal Brief filed Aug. 3, 2006", 18 pgs.

"U.S. Appl. No. 09/711,578, Appeal Brief filed Oct. 27, 2004", 19 pgs.

"U.S. Appl. No. 09/711,578, Final Office Action mailed Jan. 10, 2006", 8 pgs.

"U.S. Appl. No. 09/711,578, Final Office Action mailed Apr. 23, 2004", 7 pgs.

"U.S. Appl. No. 09/711,578, Non Final Office Action mailed Jan. 7, 2005", 7 pgs.

"U.S. Appl. No. 09/711,578, Non Final Office Action mailed Jul. 15, 2005", 8 pgs.

"U.S. Appl. No. 09/711,578, Non Final Office Action mailed Sep. 8, 2003", 7 pgs.

"U.S. Appl. No. 09/711,578, Response filed Feb. 9, 2004 to Non Final Office Action mailed Sep. 8, 2003", 6 pgs.

"U.S. Appl. No. 09/711,578, Response filed May 9, 2005 to Non Final Office Action mailed Jan. 7, 2005", 7 pgs.

"U.S. Appl. No. 09/711,578, Response filed Sep. 23, 2004 to Final Office Action mailed Apr. 23, 2004", 5 pgs.

"U.S. Appl. No. 09/711,578, Response filed Oct. 17, 2005 to Non Final Office Action mailed Jul. 15, 2005", 8 pgs.

"U.S. Appl. No. 09/717,433, Advisory Action mailed Oct. 16, 2007", 3 pgs.

"U.S. Appl. No. 09/717,433, Final Office Action mailed May 8, 2007", 7 pgs.

"U.S. Appl. No. 09/717,433, Final Office Action mailed Sep. 8, 2008", 8 pgs.

"U.S. Appl. No. 09/717,433, Final Office Action mailed Nov. 18, 2003", 4 pgs.

"U.S. Appl. No. 09/717,433, Non Final Office Action mailed May 2, 2006", 8 pgs.

"U.S. Appl. No. 09/717,433, Non Final Office Action mailed May 4, 2005", 4 pgs.

"U.S. Appl. No. 09/717,433, Non Final Office Action mailed Jun. 3, 2003", 13 pgs.

"U.S. Appl. No. 09/717,433, Non Final Office Action mailed Oct. 18, 2006", 8 pgs.

"U.S. Appl. No. 09/717,433, Non Final Office Action mailed Nov. 8, 2004", 4 pgs.

"U.S. Appl. No. 09/717,433, Non-Final Office Action mailed Feb. 5, 2009", 13 pgs.

"U.S. Appl. No. 09/717,433, Non-Final Office Action mailed Feb. 6, 2008", 9 pgs.

"U.S. Appl. No. 09/717,433, Pre-Appeal Brief Request for Review filed Aug. 8, 2007", 5 pgs.

"U.S. Appl. No. 09/717,433, Response filed Jan. 18, 2007 to Non Final Office Action mailed Oct. 18, 2006", 7 pgs.

"U.S. Appl. No. 09/717,433, Response filed Feb. 8, 2005 to Non Final Office Action mailed Nov. 8, 2004", 10 pgs.

"U.S. Appl. No. 09/717,433, Response filed Jun. 3, 2009 to Non Final Office Action mailed Feb. 5, 2009", 17 pgs.

"U.S. Appl. No. 09/717,433, Response filed Jun. 5, 2008 to Non-Final Office Action mailed Feb. 6, 2008", 13 pgs.

"U.S. Appl. No. 09/717,433, Response filed Jul. 9, 2007 to Final Office Action mailed May 8, 2007", 7 pgs.

"U.S. Appl. No. 09/717,433, Response filed Aug. 1, 2005 to Non Final Office Action mailed May 4, 2005", 4 pgs.

"U.S. Appl. No. 09/717,433, Response filed Aug. 2, 2006 to Non Final Office Action mailed May 2, 2006", 11 pgs.

"U.S. Appl. No. 09/717,433, Response filed Sep. 2, 2003 to Non Final Office Action mailed Jun. 3, 2003", 11 pgs.

"U.S. Appl. No. 09/717,433, Response filed Nov. 5, 2007 to Final Office Action mailed May 8, 2007", 14 pgs.

"U.S. Appl. No. 09/717,433, Response filed Nov. 10, 2008 to Final Office Action mailed Sep. 8, 2008", 17 pgs.

"U.S. Appl. No. 09/717,433, Response filed Nov. 10, 2008 to Final Office Action mailed Sep. 8, 2008", 17 pgs.

"U.S. Appl. No. 11/004,699, Appeal Brief filed Jan. 17, 2007", 23 pgs.

"U.S. Appl. No. 11/004,699, Final Office Action mailed Jul. 14, 2006", 7 pgs.

"U.S. Appl. No. 11/004,699, Non Final Office Action mailed Jan. 20, 2006", 6 pgs.

"U.S. Appl. No. 11/004,699, Non Final Office Action mailed Aug. 5, 2005", 6 pgs.

"U.S. Appl. No. 11/004,699, Pre-Appeal Brief Request for Review filed Sep. 14, 2006", 4 pgs.

"U.S. Appl. No. 11/004,699, Preliminary Amendment filed Dec. 3, 2004", 14 pgs.

"U.S. Appl. No. 11/004,699, Response filed Apr. 20, 2006 to Non Final Office Action mailed Jan. 20, 2006", 15 pgs.

"U.S. Appl. No. 11/004,699, Response filed Nov. 7, 2005 to Non Final Office Action mailed Aug. 5, 2005", 14 pgs.

"U.S. Appl. No. 11/195,578, Non-Final Office Action mailed May 28, 2009", 23 pgs.

"eBay Website", *Existed on Oct. 14,1999 Retrieved From the Way Back Machine,* 1-31.

"eBay: The Feedback Forum", www.archive.org:, (Oct. 12, 1999), 5.

"Square Trade's online dispute resolution process, step by step" *Square Trade* website.www.squaretrade.com from www.archive.org, (May 10, 2000).

"UAUTOBID.com, Inc. Introduces the Capabilty to Purchase Specific Vechicles Online", *Business Wire,* (Sep. 13, 1999), 1.

Rule, Colin, "Online Dispute Resolution for Business—B2B, E-Commerce, Consumer, Employment, Insurance, and Other Commercial Conflicts", *Online Dispute Resolution for Business, Jossey-Bass, A Wiley Imprint,* (2002), 1-326.

*Feedback Forum: Wayback machine*, (Jan. 16, 1999), 7 pgs.

U.S. Appl. No. 09/583,216, Response filed Sep. 17, 2009 to Non Final Office Action mailed 4-17-0, 9 pgs.

U.S. Appl. No. 09/717,433, Final Office Action mailed Sep. 18, 2009, 13 pgs.

U.S. Appl. No. 11/195,578, Response filed Sep. 28, 2009 to Non Final Office Action mailed 95-28-09, 21 pgs.

| NON-PAYING BIDDER ITEMS TABLE | | | | | |
|---|---|---|---|---|---|
| ITEM NO. | SELLER USER ID | NPB USER ID | REASON FOR FAILED TRANSACTION | NOTICE DATE | NOTICE REASON |
| | | | | | |
| 302 | 304 | 306 | 308 | 310 | 312 |

FIG. 3

| NON-PAYING BIDDERS TABLE | | | | | |
|---|---|---|---|---|---|
| NPB USER ID | ITEM NO. | VALID WARNING COUNT | NPB TICK | REASON FOR NPB TICK | SUSPENDED STATUS |
| | | | | | |
| 402 | 404 | 406 | 408 | 410 | 412 |

FIG. 4

| SELLERS COMPLAINT TABLE | | | | |
|---|---|---|---|---|
| SELLER'S USER ID | NPB USER ID | DATE OF COMPLAINT | REASON FOR COMPLAINT | STATUS OF COMPLAINT |
| | | | | |

| SELLERS FVF REQUEST TABLE | | | | | | |
|---|---|---|---|---|---|---|
| SELLER'S USER ID | NPB USER ID | ITEM NO. | ACTION DESIRED | REASON FOR FVF CREDIT | CREDIT DATE | CREDIT AMOUNT |
| | | | | | | |

| Quick Summary | Time Frame |
|---|---|
| 1. Contact each other after your auction has ended | Generally within 3 business days is a good idea. |
| 2. Complete a Non-Paying Bidder Alert Form. | After 7 days but not past 45 days of your auction's close. |
| 3. Try to work things out. | After you file a Non-Paying Bidder Alert, try to work things out with your bidder in the next 10 days. |
| 4. Request your Final Value Fee credit. | If you still haven't resolved things after 10 days of filing an Alert, complete the Final Value Fee Credit Request Form within 60 days of your auction's close. |

Special note about Dutch Auctions: They work the same as other auctions with one exception: You may file a Non-Paying Bidder Alert Form only once per auction for as many bidders as necessary. That is, you cannot go back and file additional Alerts if you have more non-paying bidders from the same auction.

Special note to bidders: If you are a bidder and believe you received an unfair warning, you may appeal it by using eBay's Non-Paying Bidder Appeal Form. Warnings will remain on your record until they are successfully appealed.

Click here to visit our Non-Paying Bidder Frequently Asked Questions page.

Announcements | Register | eBay Store | SafeHarbor (Rules & Safety) | Feedback Forum | About eBay
Home | My eBay | Site Map Browse | Sell | Services | Search | Help | | Community
Basics | Buyer Guide | Seller Guide | My Info | Billing | Rules & Safety

| | | | | | | home | my page | site map | sign in |
|---|---|---|---|---|---|---|---|---|---|

| Browse | Sell | Services | Search | Help | Community |
|---|---|---|---|---|---|

| overview | registration | buying & selling | my page | about me | feedback forum | safe harbor |
|---|---|---|---|---|---|---|

▷ Check out <u>Modern and Contemporary Art</u> on eBay Great Collections.    [        ] Search <u>tips</u>
☐ Search titles and descriptions

Non-Paying Bidder Alert Form

The Non-Paying Bidder Alert Form is intended to be a workout period to help buyers and sellers resolve their trading problems. After you file a Non-Paying Bidder Alert, eBay will send an email to both you and the high bidder, advising the high bidder that you have notified eBay that the bidder is a potential non-paying bidder and encouraging the high bidder to complete the transaction. You must file a Non-Paying Bidder Alert Form before you may request a Final Value Fee credit. If you have any questions about our Non-Paying Bidder Policy, click <u>here.</u>

Please use care when filing a Non-Paying Bidder Alert--this Form should be used only if the high bidder is unresponsive. Using this Form as a tool to intimidate or coerce your buyers into completing the transaction may be cause for suspension.

To file a Non-Paying Bidder Alert against another eBay user:

- You must have a registered eBay User ID and password.
- You must be the seller of that item.
- At least 7 days and no more than 45 days have passed since the auction ended.
- The auction must have received at least one winning bid (for reserve auctions, this means at least one bid met or exceeded the reserve price.)
- NOTE: If your auction was a Dutch auction, you may file a Non-Paying Bidder Alert against as many bidders as you deem necessary, but you are entitled to file a Non-Paying Bidder Alert Form only once for each such auction. Thus, please wait until you know the staus of all winning bidders before you file a Non-Paying Bidder Alert Form.

If you've satisfied all these conditions and want to file a Non-Paying Bidder Alert, please fill out the following form.

Your <u>User ID</u>: [          ]

Your Password: You can also use your email address.
[          ]

<u>Forgot</u> your password?

Save time by <u>signing in</u>. (You may also <u>sign in securely</u>).

| Item Number | [                              ] |
|---|---|

Click [ Submit ] to continue.

<u>Announcements</u> | <u>Register</u> | <u>eBay Store</u> | <u>SafeHarbor (Rules & Safety)</u> | <u>Feedback Forum</u> | <u>About eBay</u>

FIG. 10A

1010 home | my page | site map | sign in

Browse | Sell | Services | Search | Help | Community

▷ QA Staging Test Environment. Schema is e199_staging_main

[Search] tips
☐ Search titles and descriptions

Non-Paying Bidder Alert Form

| "npb mockups" |
| Item #1021721 |

Date Auction Ended: *07/25/00*
Final Bid Price: *$2.25*

Please complete all fields that provided below.       1012

| Reason for Non-Paying Bidder Alert | Select reason from choices provided. |
|---|---|
| Bidders e-mail address | testuser3@superslice.com |

Please make sure that you have provided accurate information. eBay may use information provided here to identify bidders who are not complying with eBay rules.

Filing false Non-Payable Bidder Alerts is a form of harassment. Sellers found to be guilty of this offense will be suspended.

Click [ Submit ] to enter your Non-Paying Bidder Alert.

default

FIG. 10B

| home | my page | site map | sign in |

| Browse | Sell | Services | Search | Help | Community |

| overview | registration | buying & selling | my page | about me | feedback forum | safe harbor |

▷ Check out Modern and Contemporary Art on eBay Great Collections.

[Search box] [Search] tips

☐ Search titles and descriptions

Final Value Fee Credit Request Form

To request credit for Final Value Fees from a listing:

- You must have filed a Non-Paying Bidder Alert Form
- At least 10 days passed since you filed the Non-Paying Bidder Alert Form.
- No more than 60 days passed since the auction ended.
- Insertion fees and fees for listing options are non-refundable.

Note: Once you submit this Final Value Fee Credit Request Form, the high bidder will receive an email from eBay and may receive a Non-Paying Bidder Warning, which may result in the suspension of that user's account.

If you've satisfied all these conditions and want to file a Non-Paying Bidder Alert, please fill out the following form.

Your User ID: [          ]
You can also use your email address.

Your Password: [          ]
Forgot your password?

Save time by signing in. (You may also sign in securely).

| Item Number | [          ] |

Click [ Submit ] to continue.

Announcements | Register | eBay Store | SafeHarbor (Rules & Safety) | Feedback Forum | About eBay

FIG. 11A

1108 home | my page | site map | sign in

| Browse | Sell | Services | Search | Help | Community |

▷ QA Staging Test Environment. Schema is e199_staging_main

[    ] Search  tips
☐ Search titles and descriptions

Final Value Fee Credit Request

| "npb mockups" |
| Item #1021721 |

Date Auction Ended: *07/25/00*
Final Bid Price: *$2.25*

Please complete all fields that provided below.                    1110

| Did you receive any money from the bidder? | ⦿ No  ○ Yes   If Yes, how much? [    ] (numerals and decimal point '.' only.) |
|---|---|
| Reason for refund | -- <br> Select reason from choices provided. |
| Bidders e-mail address | testuser3@superslice.com |

Please make sure that you have provided accurate information. eBay may use information provided here to identify bidders who are not complying with eBay rules.

Filing false Non-Payable Bidder Alerts is a form of harassment. Sellers found to be guilty of this offense will be suspended.

Click [ Submit ] to enter your final value fee credit request.

FIG. 11B

1120 home | my page | site map | sign in

Browse | Sell | Services | Search | Help | Community

▷ QA Staging Test Environment. Schema is e199_staging_main

[Search] tips

☐ Search titles and descriptions

Final Value Fee Credit Request

"npb mockups"
Item #1021722

Date Auction Ended: *Jul-25-00*
Final Bid Price: *$2.00*

Please complete all fields that provided below to apply for credit.

This form allows you to request final value fee for this item. Click "Continue" button below to submit your request.

Bidder #1  Only provide information if this bidder backed out ~1122

| Did you receive any money from the bidder? | ⊙ No ○ Yes    If Yes, how much? [      ] (numerals and decimal point '.' only.) |
|---|---|
| Reason for refund | -- Select reason from choices provided. |
| Bidders e-mail address | [-- ▼] Select a bidder from the list provided. |

Bidder #2  Only provide information if this bidder backed out ~1124

| Did you receive any money from the bidder? | ⊙ No ○ Yes    If Yes, how much? [      ] (numerals and decimal point '.' only.) |
|---|---|
| Reason for refund | -- Select reason from choices provided. |
| Bidders e-mail address | [-- ▼] Select a bidder from the list provided. |

Please make sure that you have provided accurate information. eBay may use information provided here to identify bidders who are not complying with eBay rules.

Filing false Non-Payable Bidder Alerts is a form of harassment. Sellers found to be guilty of this offense will be suspended.

Click [Continue] to enter your final value fee credit request.

FIG. 11C

1202 home | my page | site map | sign in

Browse | Sell | Services | Search | Help | Community basics | buyer guide | seller guide | my info | billing | rules & safety ▷ Check out Modern and Contemporary Art on eBay Great Collections.

[Search]  tips

☐ Search titles and descriptions

Non-Paying Bidder Appeal

To appeal a warning which you feel you have received in error, please provide the following information to eBay, using the message field on this form:

- The reason for your appeal
- Any supporting information

Your User ID: [____]
You can also use your email address.       1204

Your Password: [____]
Forgot your password?

Save time by signing in. (You may also sign in securely).

| Item Number | [____] 1206 |
| Message | [____] |

[Send Inquiry] [Clear all data]            1208

FIG. 12

1302 home | my page | site map | sign in

Browse | Sell | Services | Search | Help | Community

▷ QA Staging Test Environment. Schema is e199_staging_main

[Search] tips
☐ Search titles and descriptions

NPB Appeal Confirmation

Please complete all fields provided below to update users account

| Item Number | 1021722 |
|---|---|
| Sellers UserID | test2@superslide.com |
| Bidders UserID | test1@superslide.com |
| Reason for NPB Appeal | [--  ▼] Select reason from choices provided. |
| NPB Action Request | [--  ▼] Select reason from choices provided. |

Press the confirm button to complete the transaction and update test1@superslice.com's deadbeat score.

[confirm]

defualt

FIG. 13

1402 home | my page | site map | sign in

| Browse | Sell | Services | Search | Help | Community |

▷ QA Staging Test Environment. Schema is e199_staging_main

[ ] Search    tips
☐ Search titles and descriptions

Transaction Backout Profile for test1@superslice.com (0)

[ View user's eNotes ]

Credit Requests: 2
Unique NPB Score: 1
Total NPB Score: 1
Warnings Issued: 0
User Status: Confirmed Here is the list of items that test1@superslice.com (0) has received full or partial credit for:

| Code | Item | Start | End | Price | Title | Bidder |
|---|---|---|---|---|---|---|
| 2 | 1021763 | Aug-04-00 | Jul-25-00 12:46:35 | 2.00 | npb mockups2 | test2@superslice.com (101) ★ |
| 2 | 1021721 | Aug-04-00 | Jul-25-00 11:24:57 | 2.25 | npb mockups | testuser3 (0) |

Here is the list of transactions that test1@superslice.com (0) has backed out of:

| Code | Item | Start | End | Price | Title | Bidder |
|---|---|---|---|---|---|---|
| 3 [Remove] | 1021722 | Aug-04-00 | Jul-25-00 11:25:06 | 2.25 | npb mockups-dutch | test2@superslice.com (101) ★ |

Announcements | Register | eBay Store | SafeHarbor (Rules & Safety) | Feedback Forum | About eBay

FIG. 14

| 1505 | 1510 | 1515 | 1520 | 1525 | 1530 | 1535 | 1540 | 1545 |
|---|---|---|---|---|---|---|---|---|
| TYPE | COUNTER PARTY | TRANS-ACTION IDENTIFIER | DATE | AMOUNT | REASON | FILED ON | STATUS | ACTION |
| | | | | | | | | |

FIG. 15

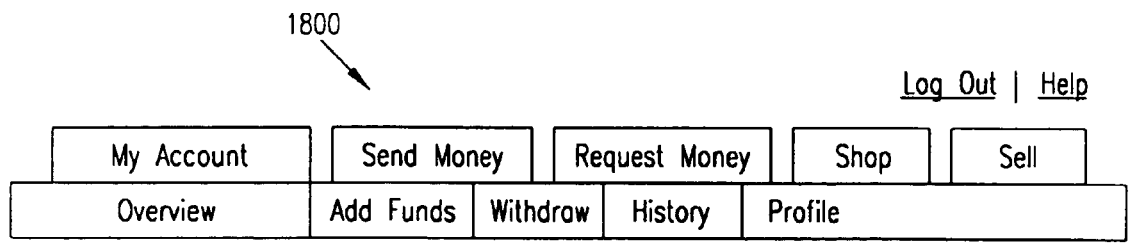

```
                                                              Log Out | Help
  ┌────────────┬──────────────┬───────────────┬──────┬──────┐
  │ My Account │ Send Money   │ Request Money │ Shop │ Sell │
  ├──────────┬─┴──────────┬───┴──────┬────────┬┴──────┴──────┐
  │ Overview │ Add Funds  │ Withdraw │ History│ Profile      │
  └──────────┴────────────┴──────────┴────────┴──────────────┘
```

Chargeback Details

Transaction ID: #02734325HD806192X
Buyer Name: dom-per-unver keefe
Buyer Email: mkeefe-dom-per-unver@paypal.com
Transaction Amount: $85.96
Transaction Date: Mar 11, 2003

- - - - - - - - - - - - - - - - - - - - - - - - - - - - - - -

PayPal Case ID: PP-000-950-905
Reason for Dispute: Non Receipt
Chargeback Amount: $34.67
Chargeback Date: Mar 11, 2003
Status: Waiting For Seller's Fax
Status Details: We are currently waiting for you to fax us proof that you previously issued a refund to the buyer outside of PayPal.

Your fax must be received within 5 days (by Mar 16, 2003), if your fax is not received within the specified timeframe, we will continue with our investigation.

Please be sure to use the fax cover sheet provided here. Faxes received without the provided PayPal cover sheet will not be processed.

[ Return to Transaction Claims and Disputes ]

Mobile | Mass Pay | Money Market | ATM/Debit Card | BillPay | Referrals
About Us | Accounts | Fees | Privacy | Security Center | User Agreement | Developers | Help

FIG. 18

| My Account | Send Money | Request Money | Shop | Sell |
|---|---|---|---|---|
| Overview | Add Funds | Withdraw | History | Profile |

Provide Proof of Refund

2010 — Did you use PayPal to provide your refund?
  ⦿ Yes, my refund was issued via PayPal
2020 — ○ No, my refund was issued using a method other than PayPal

[ Continue ] [ Cancel ]
2030

Mobile | Mass Pay | Money Market | ATM/Debit Card | BillPay | Referrals
About Us | Accounts | Fees | Privacy | Security Center | User Agreement | Developers | Help

FIG. 20

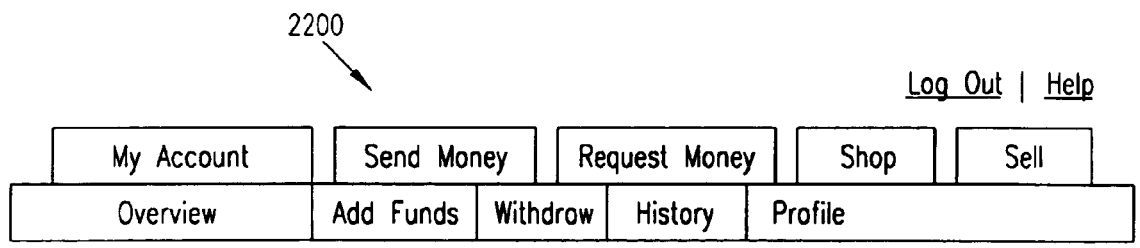

Provide Proof of Refund

Because you did not submit your refund using PayPal, you will need to provide proof of the refund. Please print this fax cover sheet to submit the details of your refund. We cannot process your submission unless you use the cover sheet provided.

Back to Disputed Transactions

Mobile | Mass Pay | Money Market | ATM/Debit Card | BillPay | Referrals
About Us | Accounts | Fees | Privacy | Security Center | User Agreement | Developers | Help

Log Out | Help

| My Account | Send Money | Request Money | Shop | Sell |

| Overview | Add Funds | Withdraw | History | Profile |

Provide Tracking Info

Please provide the tracking number and shipping provider below.

Tracking Number: [                    ] — 2310

Shipping Company:: [— Select one — ▽] — 2320

[ Submit Tracking Info ] [ Cancel ]

Mobile ׀ Mass Pay ׀ Money Market ׀ ATM/Debit Card ׀ BillPay ׀ Referrals
About Us ׀ Accounts ׀ Fees ׀ Privacy ׀ Security Center ׀ User Agreement ׀ Developers ׀ Help

FIG. 23

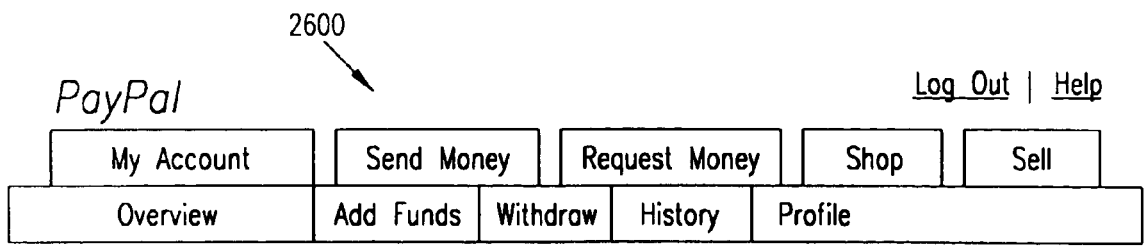

```
                                        2600
PayPal                                                    Log Out | Help
    ┌──────────────┬──────────────┬──────────────┬─────────┬────────┐
    │  My Account  │  Send Money  │ Request Money│  Shop   │  Sell  │
    ├──────────────┼────────┬─────┴────┬─────────┴─┬───────┴────────┤
    │   Overview   │Add Funds│ Withdraw │  History  │    Profile    │
    └──────────────┴────────┴──────────┴───────────┴────────────────┘
```

Contact Us - Merchandise Dispute - Buyer Protection

PayPal Buyer Protection Learn more...

PayPal Buyer Protection covers claims for significantly not as described items. An item is significantly not as described if the seller clearly misrepresents the item in a way that affects its value or usability. Please note that this does not include cases where you are merely disappointed with the item or where the item did not meet your expectations. For more detailed information on the definition of significantly not as described please see our User Agreement.

Please provide details about the condition of your purchase.

2605 — ☐ Missing parts that prevent item from being used
   · No computer processor
2610 — ☐ Externally damaged
   · Scratches, cracks, chips, rips, dents
   · Stains, odor
2615 — ☐ Missing Quantity
   · Ordered 12 units but received 6
2620 — ☐ Internally damaged
   · Doesn't power on
   · Doesn't play or plays with errors (DVD, CD, software)
2625 — ☐ Used when described as new
   · Original listing said it was "new" or "mint"
2630 — ☐ Shipping Cost Issues
   ☐ Sales Tax Issues
2635 — ☐ Different model, version, or size
   · Incompatible operating system (Windows v. Macintosh)
2640 — · Motorcycle engine v. automobile engine
   · Shoes too small to wear
2645 — ☐ Different design/pattern
   · Floral v. striped
2650 — ☐ Different category of item entirely
   · Ordered a book, got a brick 2655 — ☐ Different material
   · Cotton v. silk
   · Glass v. plastic
2660 — ☐ Less Valuable Substitute
   · Less powerful: Pentium 4 v. Pentium 3
2665 — · Lower perceived quality: branded v. generic
   ☐ Time-sensitive item arrived late
   · Concert tickets
2670 — ☐ Color difference:
   ○ Slight - Light green v. dark green
   ○ Moderate - Green v. teal
   ○ Serious - Green v. red
2675 — ☐ Ruined Food/Plants
   · Spoiled
   · Dead/wilted
2680 — ☐ Copy of original
   · Bootleg or pirated copy (music, movie, software)
   · Photocopy
2685 — ☐ Imitation
   · Fake Rolex, fake Gucci purse, fake Armani suit
2690 — ☐ Empty Box
   · Empty or contains unrelated material Please provide additional details (this information will be viewable by the seller).

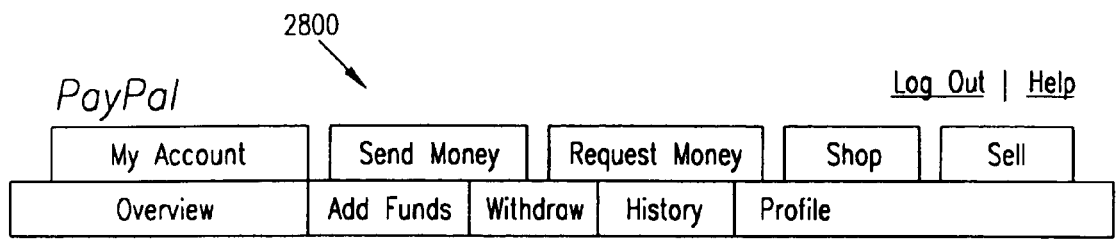

Partial Refund Offer

To offer a partial refund, enter the amount you are offering to the buyer below and click Calculate to determine the Net Refund Amount and the Fee Refunded. Click Process Refund to initiate the refund. How is my fee refund calculated?

The amount you enter for the partial refund will be checked against the amount the buyer requested. If the amount match, the claim will be closed automatically. If the partial refund you offer is less than the buyer's request, or if the buyer did not specify an amount, the buyer will be asked to accept or deny your refund offer.

The buyer will have 10 days to respond to your offer. If the buyer accepts it, the claim will close automatically. If the buyer denies, PayPal will continue to investigate the complaint.

2805 — Transaction ID: 00727049RN5150131
2810 — Name: Chitral Anderson-Lee
2815 — Email: wchal-pbpbuyer1@paypal.com
2820 — Total Amount: $5.00 USD
2825 — Buyer's requested Refund: None specified
2830 — Gross Refund Amount: [$3.00 USD] [Calculate]
2835 — Net Refund Amount: $2.91 USD
2840 — Fee Refunded: $0.09 USD
        Source of Funds: PayPal Balance
2845 — Note to Buyer: (optional)
2850

If you are refunded by eCheck and this refund fails to clear, PayPal will process the refund with funds from your PayPal account.

Ship to:
[5303223 Park Avenue, Paso Robles, CA 93446, United States ▽]

2855 [Process Refund] [Cancel]

Mobile | Mass Pay | Money Market | ATM/Debit Card | BillPay | Referrals | About Us | Accounts | Fees |
| Privacy | Security Center | User Agreement | Developers | Shops
an eBay company Copyright © 1999-2003 PayPal. All rights reserved.
Information about FDIC pass-through Insurance

FIG. 28

AUTOMATIC DISPUTE RESOLUTION

RELATED APPLICATIONS

This application claims the benefit of U.S. Provisional Application No. 60/476,784, filed Jun. 6, 2003, which is incorporated herein by reference.

TECHNICAL FIELD

The present invention relates generally to the field of commerce automation. More particularly, the present invention relates to a method and system for dealing, at least partially in an automated manner, with disputes between parties involved in electronic commerce.

BACKGROUND

A common type of a network-based transaction is purchasing goods or services via a network-based commerce facility or trading platform (e.g., a website on the Internet). One type of network-based transaction is an online-auction transaction. In an online-auction transaction, a seller offers an item for sale via an auction website in which a number of bidders access the website and bid for the item. A transaction is completed after the winning bidder pays for the item and the seller delivers the item to the winning bidder.

A common type of a network-based transaction is purchasing goods or services via a network-based commerce facility or trading platform (e.g., a website on the Internet). One type of network-based transaction is an online-auction transaction. In an online-auction transaction, a seller offers an item for sale via an auction website in which a number of bidders access the website and bid for the item. A transaction is completed after the winning bidder pays for the item and the seller delivers the item to the winning bidder.

A number of technical challenges exist with such a transaction such as a party to the transaction failing to follow through with the transaction. For example, the winning bidder may falsely claim that the seller did not deliver the auctioned item, fail to pay for the auctioned item, or provide a fraudulent check to purchase the item. In such a case, the bidder is referred to as a "non-paying bidder." As a result of a failed transaction, the seller may request a refund for a fee that may have been charged by the network-based transaction facility to facilitate the transaction.

Another problem that may occur is a seller falsely claiming the auctioned item was shipped or that a transaction did not go through, to obtain a refund when in fact a valid sale occurred.

The conventional dangers of fraud and identity theft associated with network-based transactions are well known and present unique technical challenges to overcome in a quick and efficient manner. Thus, there is a need for dealing with disputes between parties involved in a network-based transaction. The automation of procedures to handle issues and disputes presents a number of unique technical problems and challenges.

SUMMARY OF AN EMBODIMENT OF THE INVENTION

A method and system for resolving disputes between parties involved in a network-based transaction is described. One aspect of the present invention seeks to automatically facilitate the restitution of value to parties of the transaction, for example, facilitated by a network-based commerce platform or involving a network-based payment service, where a dispute has arisen with respect to the transaction.

BRIEF DESCRIPTION OF THE DRAWINGS

The present invention is illustrated by way of example and not intended to be limited by the figures of the accompanying drawings in which like references indicate similar elements and in which:

FIG. 3 is a diagrammatic representation of an exemplary non-paying bidder items table of the database illustrated in FIG. 2;

FIG. 4 is a diagrammatic representation of an exemplary non-paying bidders table of the database illustrated in FIG. 2;

FIG. 5 is a diagrammatic representation of an exemplary sellers complaint table of the database illustrated in FIG. 2;

FIG. 6 is a diagrammatic representation of an exemplary sellers final value fee request table of the database illustrated in FIG. 2;

FIG. 9 illustrates exemplary interfaces providing information about a non-paying bidder program;

FIGS. 10A and 10B illustrate exemplary interfaces for entering a non-paying bidder alert or complaint form;

FIGS. 11A through 11C illustrate exemplary interfaces for entering a final value fee credit request form;

FIG. 12 illustrates an exemplary interface for entering a non-paying bidder appeal;

FIG. 13 illustrates an exemplary interface for providing a non-paying bidder appeal confirmation;

FIG. 14 illustrates an exemplary interface for providing a transaction backout profile;

FIG. 15 is a diagrammatic representation of an exemplary disputes and requests table;

FIG. 18 illustrates one embodiment of a chargeback details view;

FIG. 20 illustrates one embodiment of a provide proof of refund view;

FIG. 22 illustrates one embodiment of a get alternative refund information view;

FIG. 23 illustrates one embodiment of a provide shipping tracking information view;

FIG. 26 illustrates one embodiment of a NAD dispute form;

FIG. 28 illustrates one embodiment of the Partial Refund Offer Form;

DETAILED DESCRIPTION

A method and system for resolving disputes between parties involved in electronic commerce is described. One aspect of the present invention seeks to facilitate the restitution of value to parties of a transaction, for example, facilitated by a network-based commerce platform or involving a network-based payment service, where a dispute has arisen with respect to the transaction. It will be appreciated that when an agreement is reached between parties to transact, that agreement imposes reciprocal obligations on each of the relevant parties. Where a dispute arises, one party may have performed an action to at least partially satisfy his or her obligations. For example, a buyer party to a transaction may have made payment to a seller party, where after the seller party has failed to perform by not delivering a transacted product or service to the buyer. Alternatively, a seller party may have shipped a product, or at least partially performed a service, to the benefit of the buyer party when a dispute arises and the buyer party fails to make a payment to the seller party.

According to one aspect, the present invention attempts to reduce abuse by parties failing to follow through with a transaction, for example, by automatically providing a party accused of failing to follow through in a transaction an opportunity to resolve or complete the transaction without (or at least with reduced) human interaction by operators of the network-based transaction facility. For one embodiment, a submission of a complaint is submitted to a network-based transaction facility. The complaint is related to a party in a failed transaction. A resolution of the complaint is facilitated and restitution is provided to one of the parties upon resolving the complaint.

In the following embodiments, for purposes of explanation, numerous specific details are set forth in order to provide a thorough understanding of the present invention. It will be evident, however, to one skilled in the art that the present invention may be practiced without these specific details.

Terminology

In the following embodiments, the term "transaction" or "transactions" refers to any communications between two or more entities and is to be construed to include, but not limited to, commercial transactions including sale and purchase transactions, online-auction transactions and other like transactions.

Transaction Facility

Figure 1:
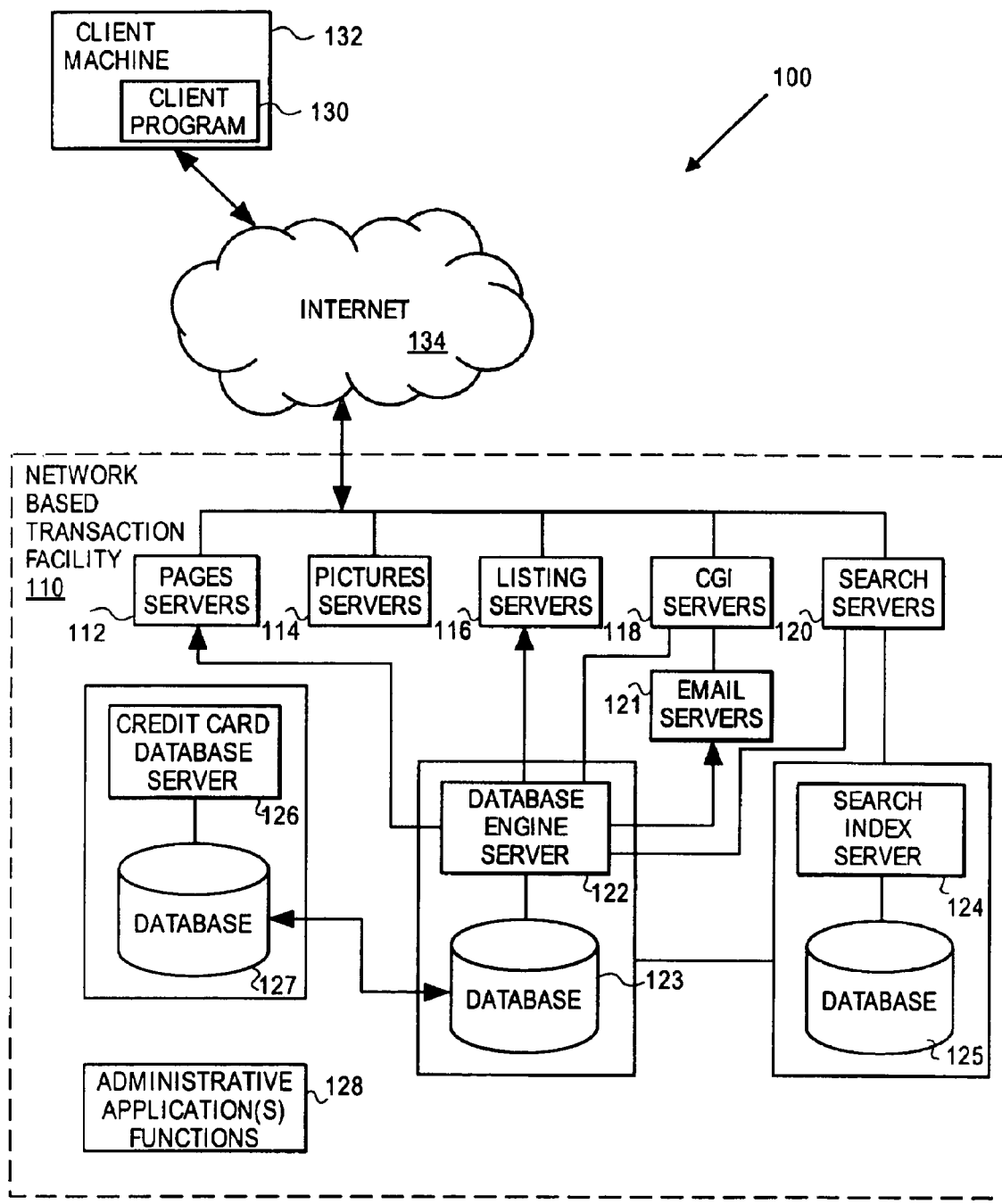
FIG. 1 is a block diagram illustrating an exemplary network-based transaction facility in the form of an Internet-based auction facility.

FIG. 1 is a block diagram illustration of an exemplary network-based transaction (or commerce) facility 100 in the form of an "Internet" network-based transaction facility 110. While an exemplary embodiment of the present invention is described within the context of an auction facility, it will be appreciated by those skilled in the art that the invention will find application in many different types of computer-based, network-based, or electronic-commerce (e-commerce) based facilities.

The network-based transaction facility 110 includes one or more of a number of types of front-end servers, namely pages servers 112 that deliver web pages (e.g., markup language documents), pictures servers 114 that dynamically deliver images to be displayed within Web pages, listing servers 116, CGI servers 118 that provide an intelligent interface to the back-end of network-based transaction facility 110, and search servers 120 that handle search requests to the network-based transaction facility 110. Email servers 121 provide, inter alia, automated email communications to users of the network-based transaction facility 110. The network-based transaction facility 110 also includes administrative application(s) functions 128 for providing functions for applications running the network-based transaction facility 110.

The back-end servers include a database engine server 122, a search index server 124, and a credit card data server 126, each of which maintains and facilitates access to respective databases 123, 125, and 127, respectively.

The Internet-based network-based transaction facility 110 may be accessed by a client program 130, such as a browser (e.g., the Internet Explorer® distributed by Microsoft Corp. of Redmond, Wash.) that executes on a client machine 132 and accesses the network-based transaction facility 110 via a network such as, for example, an Internet 134. Other examples of networks that a client may utilize to access the network-based transaction facility 110 include a wide area network (WAN), a local area network (LAN), a wireless network (e.g., a cellular network), or the Plain Old Telephone Service (POTS) network.

Database Structure

Figure 2:
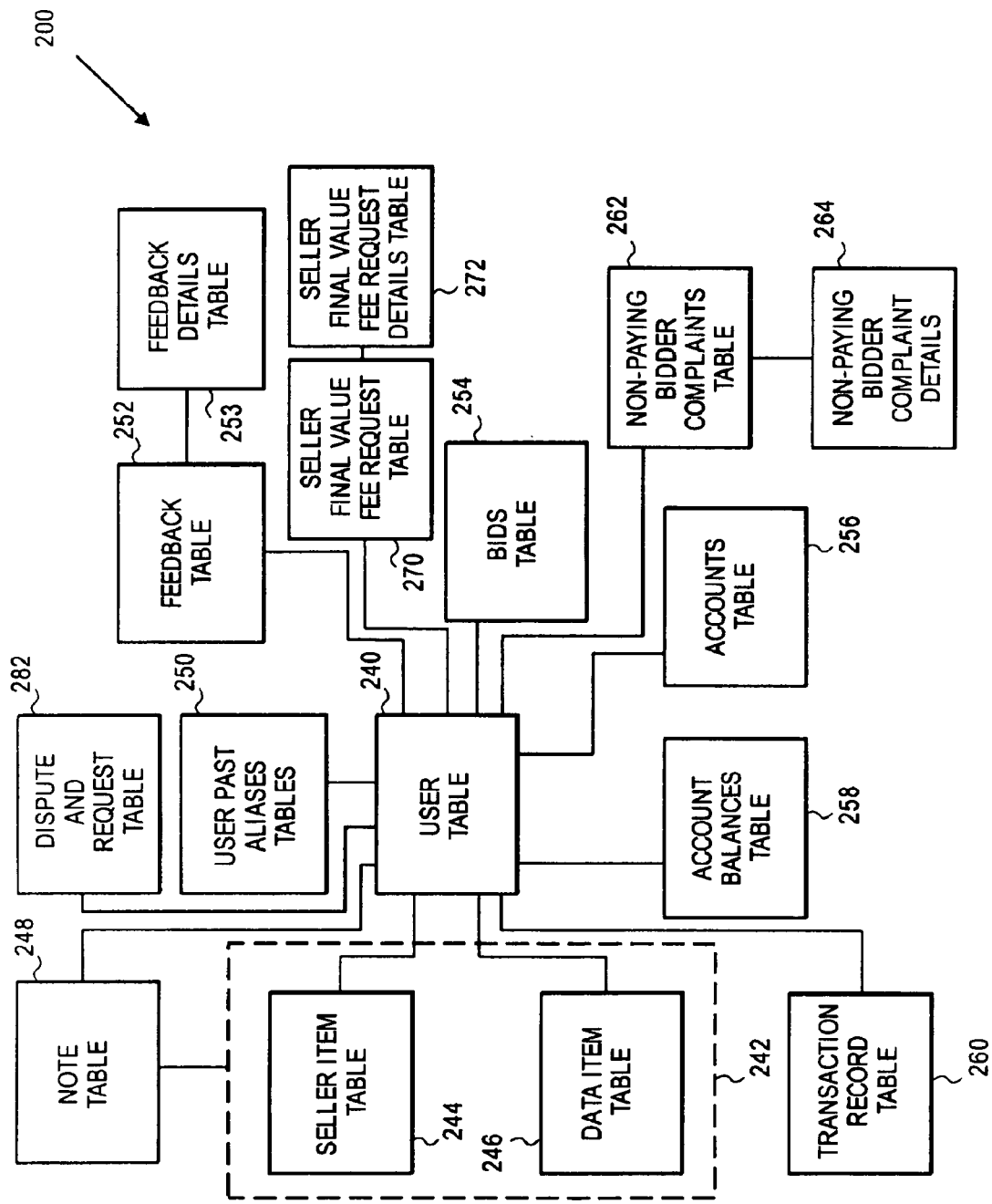
FIG. 2 is a database diagram illustrating an exemplary database for the transaction facility.

FIG. 2 is a database diagram illustration of an exemplary database 200, maintained by and accessed via a database engine server 122, which at least partially implements and supports the network-based transaction facility 110. The database 200 may, in one embodiment, be implemented as a relational database and includes a number of tables having entries, or records, that are linked by indices and keys. In an alternative embodiment, database 200 may be implemented as a collection of objects in an object-oriented database.

Central to the database 200 is a user table 240, which contains a record for each user of the network-based transaction facility 110. A user may operate as a seller, buyer, or both, within the network-based transaction facility 110. The database 200 also includes item tables 242 that may be linked to the user table 240. Specifically, the item tables 242 includes a seller item table 244 and a data items table 246. A user record in user table 240 may be linked to multiple items that are being, or have been, auctioned via network-based transaction facility 110. A link indicates whether the user is a seller or a bidder (or buyer) with respect to items for which records exist within the item tables 242. Database 200 also includes a note table 248 populated with note records that may be linked to one or more item records within the item tables 242 and/or to one or more user records within the user table 240. Each note record within the note table 248 may include, inter alia, a comment, description, history or other information pertaining to an item being auctioned via network-based transaction facility 110, or to a user of network-based transaction facility 110.

A number of other tables are also shown to be linked (directly or indirectly) to the user table 240, namely a user past aliases table 250, a feedback table 252, a feedback details table 253, a transaction record table 260, an account balances table 258, an accounts table 256, a bids table 254, a seller final value fee request table 270, a seller final value fee request details table 272, a non-paying bidder complaints table 262, a non-paying bidder complaint details table 264, and a dispute and request table 282.

Non-Paying Bidder Complaint/Final Value Fee Request Record Tables

FIGS. 3-8 are diagrammatic representations of exemplary embodiments of transaction record tables that are populated with records or entries for non-performing party complaints and final value fee requests relating to failed transactions (e.g., failed Internet based auction transactions) that have been facilitated by network-based transaction facility 110. Such transaction record tables may be stored in the non-paying bidder complaints table 262, the non-paying bidder complaint details table 264, the seller final value fee request table 270, or the seller final value fee request details 272.

FIG. 3 is a diagrammatic representation of an exemplary non-paying bidder items table 300 of the database illustrated in FIG. 2. Referring to FIG. 3, non-paying bidder (NPB) items table 300 includes an item no. column 302, a seller user identifier (ID) column 304, a NPB user ID column 306, a reason for failed transaction column 308, a notice date column 310, and a notice reason column 312.

The item no. column 302 stores item identifiers of items involved in failed transactions. The seller user ID column 304 stores user IDs of sellers who auctioned the item in item no. column 302. The NPB user ID column 306 stores user IDs of buyers who did not follow through on a transaction related to the items identified in the item no. column 302. The reason for failed transaction column 308 stores reasons why the transaction failed that may be given by a seller. For example, reasons may include a buyer failing to purchase an item or providing a fraudulent check to pay for the item.

The notice date column 310 stores the date a notice was sent to the respective buyer identified in the NPB user ID column 306 that he/she has not completed the transaction for the item identified in the respective item no. column 302. The notice reason column 312 stores the reasons why the notice was sent. For example, the notice can be sent because a seller filed a final value fee refund request or the seller filed a NPB alert against the buyer.

FIG. 4 is a diagrammatic representation of an exemplary non-paying bidders table 400 of the database illustrated in FIG. 2. Referring to FIG. 4, the non-paying bidders table 400 includes a NPB user ID column 402, an item no. column 404, a valid warning count column 406, a NPB tick column 408, a reason for NPB tick column 410, and a suspended status column 412.

The NPB user ID column 402 stores the user IDs of buyers in which a complaint has been filed. The buyers listed in the NPB user ID column 402 are buyers involved in failed transactions. The item no. column 404 stores identifiers of items involved in transactions in which the buyer listed in the NPB user ID column 402 was the winning bidder and has failed to complete the transaction for the item.

The valid warning count column 406 stores a count value on the number of times the NPB received a warning for being a "non-paying bidder" or for failing to complete a transaction. The NPB tick column 408 stores the number of times the NPB has been involved in a failed transaction in which the NPB was at fault. The reason for NPB tick column 410 stores the reasons for the NPB ticks. The suspended status column 412 stores the status of the NPB to participate on the network-facility. For example, after a certain number of NPB ticks, the NPB can be suspended from participating in an on-line auction on the network-based facility.

FIG. 5 is a diagrammatic representation of an exemplary sellers complaint table 500 of the database illustrated in FIG. 2. Referring to FIG. 5, the sellers complaint table 500 includes a seller user ID column 502, a NPB user ID column 504, a date of complaint column 506, a reason for complaint column 508, and a status of complaint column 510.

The seller user ID column 502 stores the user IDs of sellers filing NPB complaints. The NPB user ID column 504 stores user IDs of buyers against which a NPB complaint has been filed. The date of complaint column 506 stores the date in which the NPB complaint was filed. The reason for complaint column 508 stores the reasons why the seller filed the NPB complaint. The status of complaint column 510 stores the status of the complaint. For example, the status can indicate that the complaint has been resolved or if it is pending.

FIG. 6 is a diagrammatic representation of an exemplary sellers final value fee (FVF) request table 600 of the database illustrated in FIG. 2. Referring to FIG. 6, the sellers FVF request table 600 includes a sellers user ID column 602, a NPB user ID column 604, an item no. column 606, an action desired column 608, a reason for FVF credit column 610, a credit date column 612, and a credit amount column 614.

The sellers user ID column 602 stores the user IDs of sellers filing a FVF refund request. The NPB user ID column 604 stores the user IDs of the NPB related to the FVF refund request by the seller. The item no. column 606 stores an identifier of the item related to the FVF refund request. The action desired column 608 stores the requests of the seller. The seller may request a refund or a credit for future transactions.

The reason for FVF credit column 610 stores the reason for the credit. For one embodiment, the following reasons are not valid reasons for filing a FVF credit: (1) the bidder paid, returned it and seller issued a refund; (2) Seller and Buyer mutually agreed not to complete the transaction; or (3) sale price to high bidder was lower than final high bid. The credit date column 612 stores the date in which a refund or a credit for future transactions was given. The credit amount column 614 stores the amount of the credit or refund given.

Figure 7:
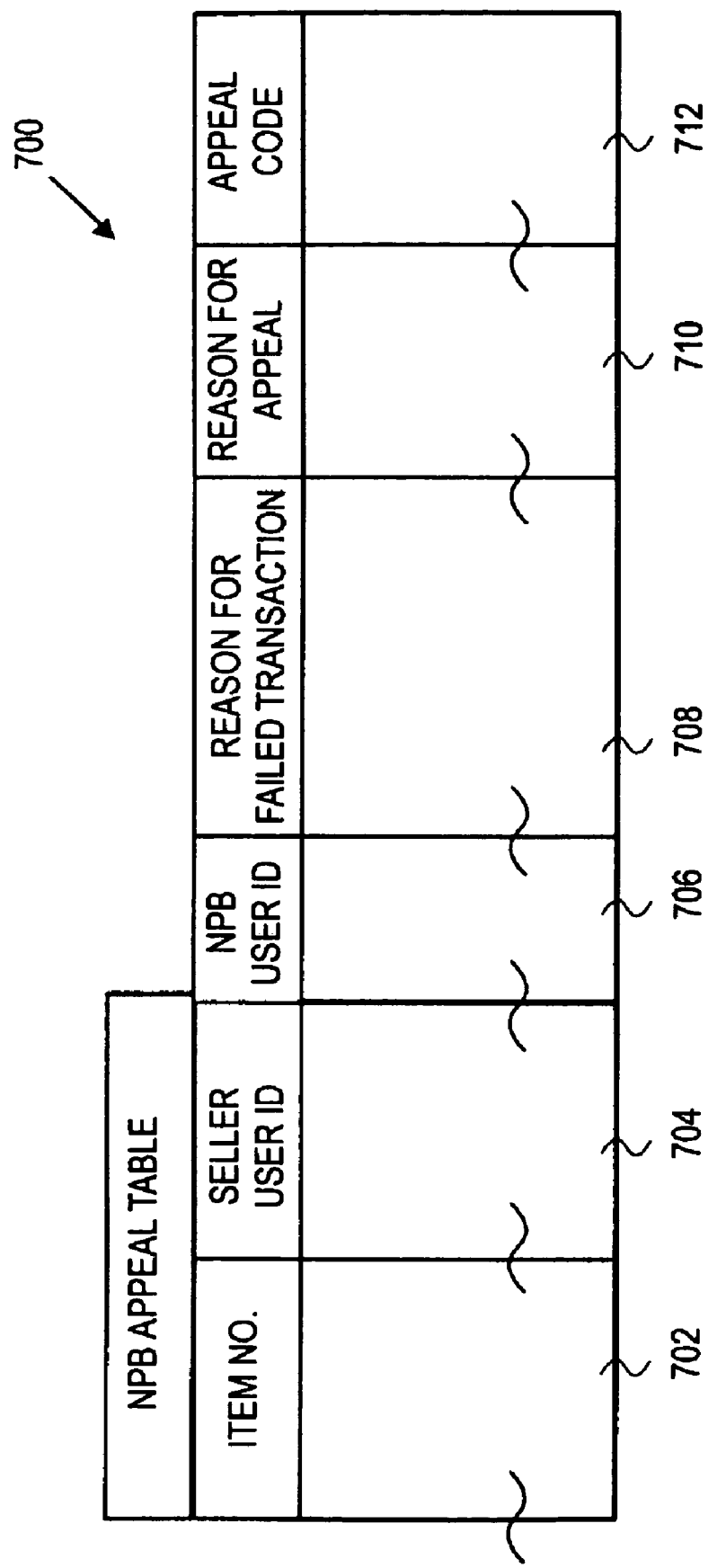
FIG. 7 is a diagrammatic representation of an exemplary non-paying bidder appeal table of the database illustrated in FIG. 2.

FIG. 7 is a diagrammatic representation of an exemplary non-paying bidder appeal table 700 of the database illustrated in FIG. 2. Referring to FIG. 7, the NPB table 700 includes an item no. column 702, seller user ID column 704, NPB user ID column 706, reason for failed transaction column 708, reason for appeal column 710, and an appeal code column 712.

The item no. column 702 stores item identifiers related to failed transactions. The failed transaction has caused an NPB to have a "tick" or count against him in which the NPB is considered at fault. The seller user ID column 704 stores user IDs of sellers who auctioned the item in the item no. column 702 and filed a NPB complaint or alert against the NPB. The NPB user ID column 706 stores user IDs of buyers who did not follow through on a transaction related to the items identified in the item no. column 702.

The 'reasons for failed transaction' column 708 stores reasons why the transaction failed. For example, reasons may include a buyer failing to pay for an item, providing a fraudulent check to pay for the item, or falsely claiming the auctioned item was not received. The reason for appeal column 710 stores reasons why the NPB is appealing a NPB tick. A valid reason for appeal can be that the NPB did pay for the item and the seller is providing a false complaint to obtain a FVF refund or credit. The appeal code column 712 stores codes related to the appeal. For example, the codes can indicate if the appeal is granted and the NPB tick is taken away or if the appeal is denied.

The above record tables are exemplary and additional column entries or tables can be used by network-based transaction facility 110 to provide services such that users of network-based transaction facility 110 may file complaints for a bidder or buyer ("non-paying bidder") who has failed to follow through on a transaction (e.g., an online auction sale). Furthermore, the network facility 100 can also provide a final value fee (FVF) refund request or credit service for sellers involved in a failed transaction. The network-based transaction facility 110 can also keep track of NPB and suspend the NPB if involved in more than a certain number of failed transactions.

In the following operations, a party is able to file a complaint against a bidder ("non-paying bidder") who has failed to follow through on a transaction (e.g., an auction sale) after a certain period of time from the end of the sale. A notification is provided to the non-paying bidder ("NPB") so that the seller and a bidder can communicate with each other to resolve the complaint or complete the transaction. If the parties cannot resolve the complaint after a certain period of time, the seller is allowed to file a FVF refund request for the FVF that the seller may have paid to facilitate the sale on the network-based facility. A NPB count or "tick" will be maintained for every failed transaction in which the NPB is involved.

Filing a Non-Paying Bidder Alert or Complaint

FIGS. 8A through 8D are flow charts illustrating an exemplary operation 800 for a network-based facility to handle non-paying bidders and to handle final value fee refund requests. The following exemplary operation 800 utilizes the record tables of FIGS. 3-7 and other information contained in the database as shown in FIG. 2.

Figure 8A:
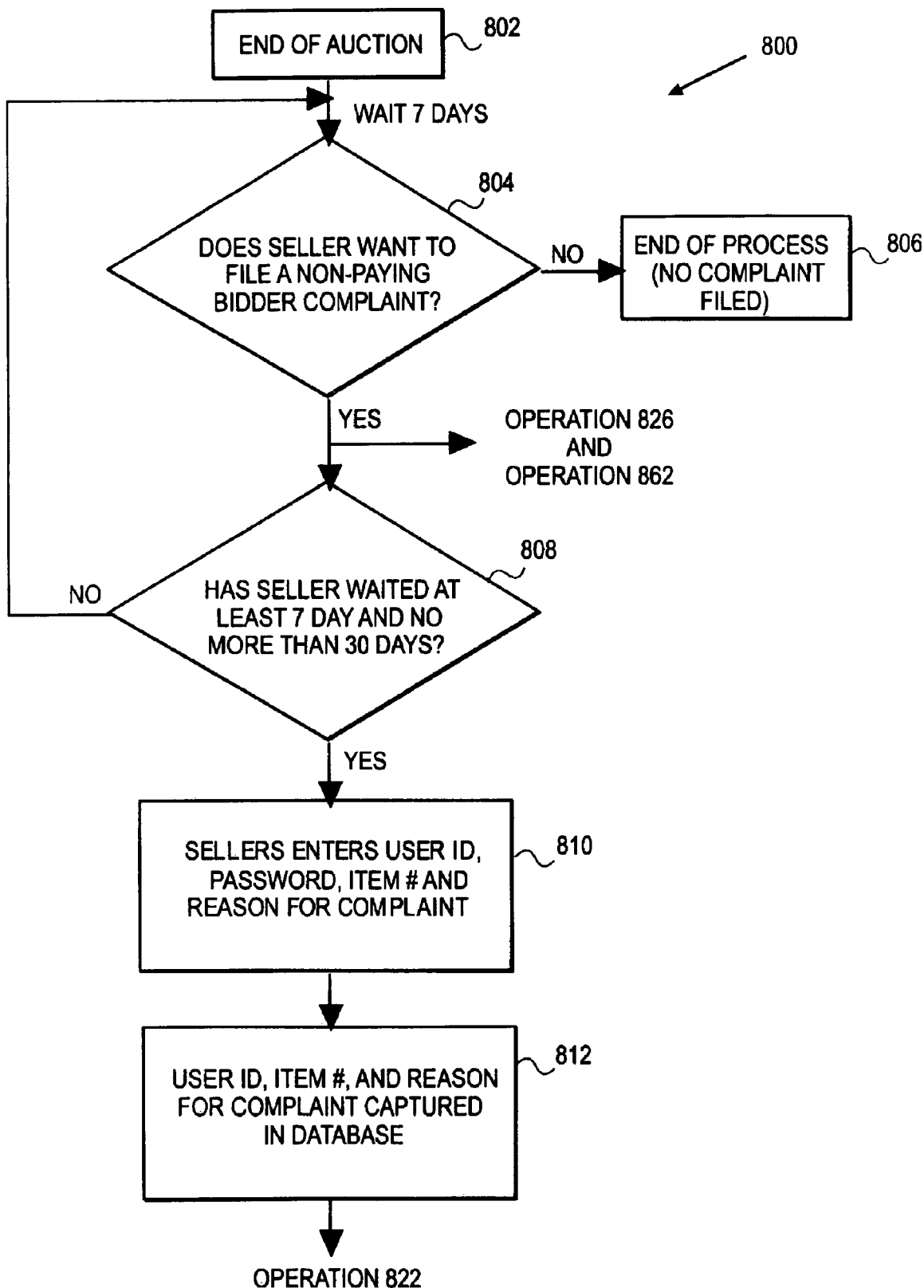
FIGS. 8A through 8D are flow charts illustrating an exemplary operation for a network-based facility to handle non-paying bidders and to handle final value fee refund requests.

Referring to FIG. 8A, for purposes of explanation, operation 800 begins at operation 802 after an end of an auction. At operation 804, a seller who was involved in a failed transaction with a buyer can file a non-paying bidder (NPB) complaint or alert. For one embodiment, the seller, however, must wait a predetermined time period (e.g., the at least 7 calendar days) before a complaint can be filed. To learn about the NPB program, the seller can access an interface such as interface 902 shown in FIG. 9 to learn more about the NPB program.

At operation 806, if the seller does not wish to file a complaint or alert, operation 800 ends. If the seller does wish to file a complaint, operation 800 can continue to operation 826, 862, or 808. At operation 808, a determination is made if the seller has waited at least 7 days and no more than 30 days. The waiting period is to give the bidder an opportunity to complete the transaction before the seller can file a complaint or request a final value fee refund or request.

Figure 10C:
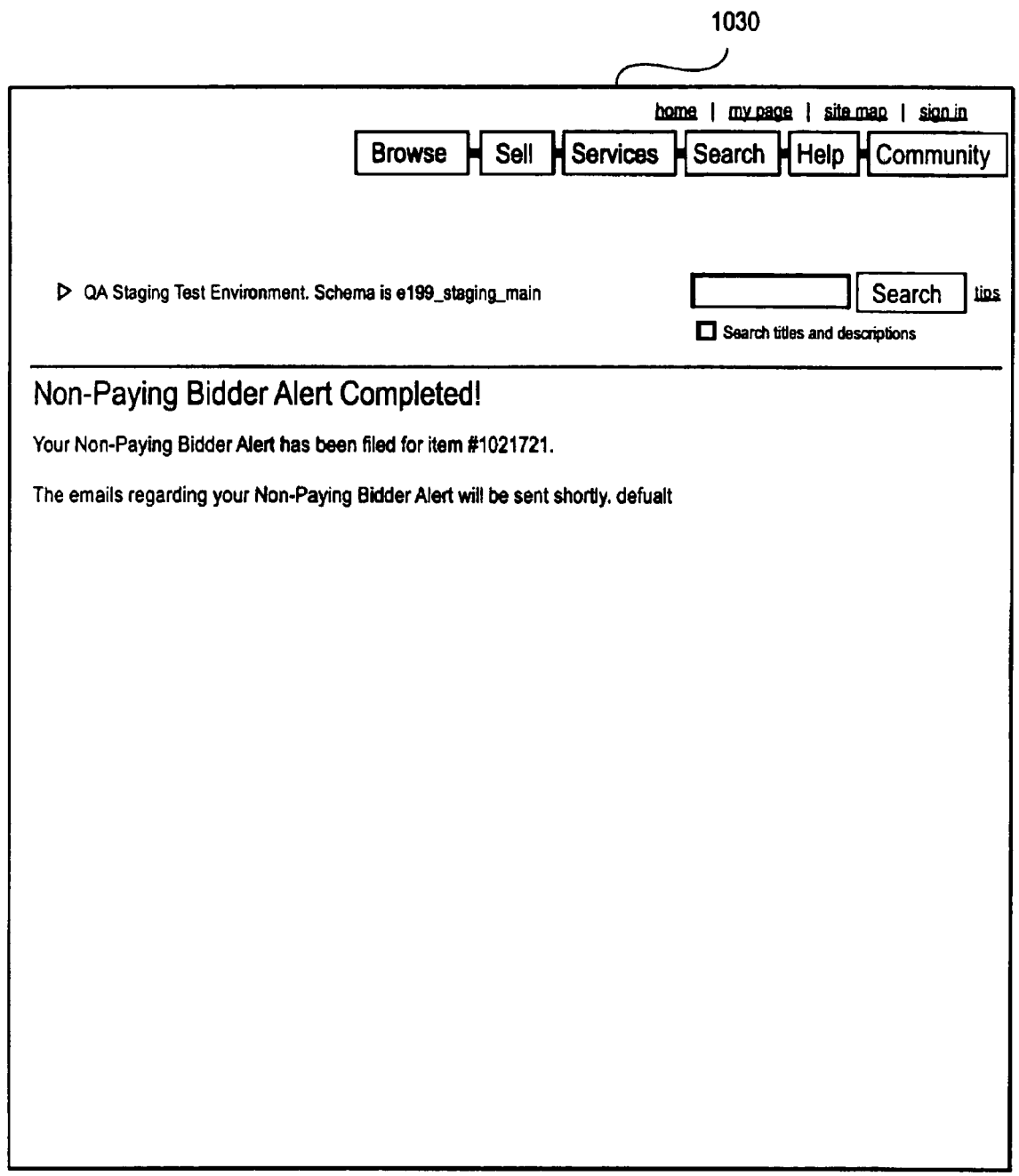
FIG. 10C illustrates an exemplary interface indicating that a non-paying bidder alert or complaint form has been filed.

If the seller has not waited at least 7 days and no more than 30 days, operation 800 returns to operation 804. If after the 7 day waiting period, but before 30 days after end of auction, at operation 810, the seller may file a NPB complaint. For example, interfaces such as interfaces 1002 and 1010, as shown in FIGS. 10A and 10B, can be presented to the seller. The seller can then enter information such as User ID, Password, and Item Number as shown in windows 1004 and 1006. The seller can also enter reasons for the complaint as shown in window 1010.

At operation 812, the information entered by the seller is captured or stored in a database such as that shown in FIG. 2. An interface such as interface 1030 shown in FIG. 10C can be presented to the seller indicating that NPB complaint or alert has been completed. Operation 800 then continues to operation 822 in FIG. 8B.

Figure 8B:
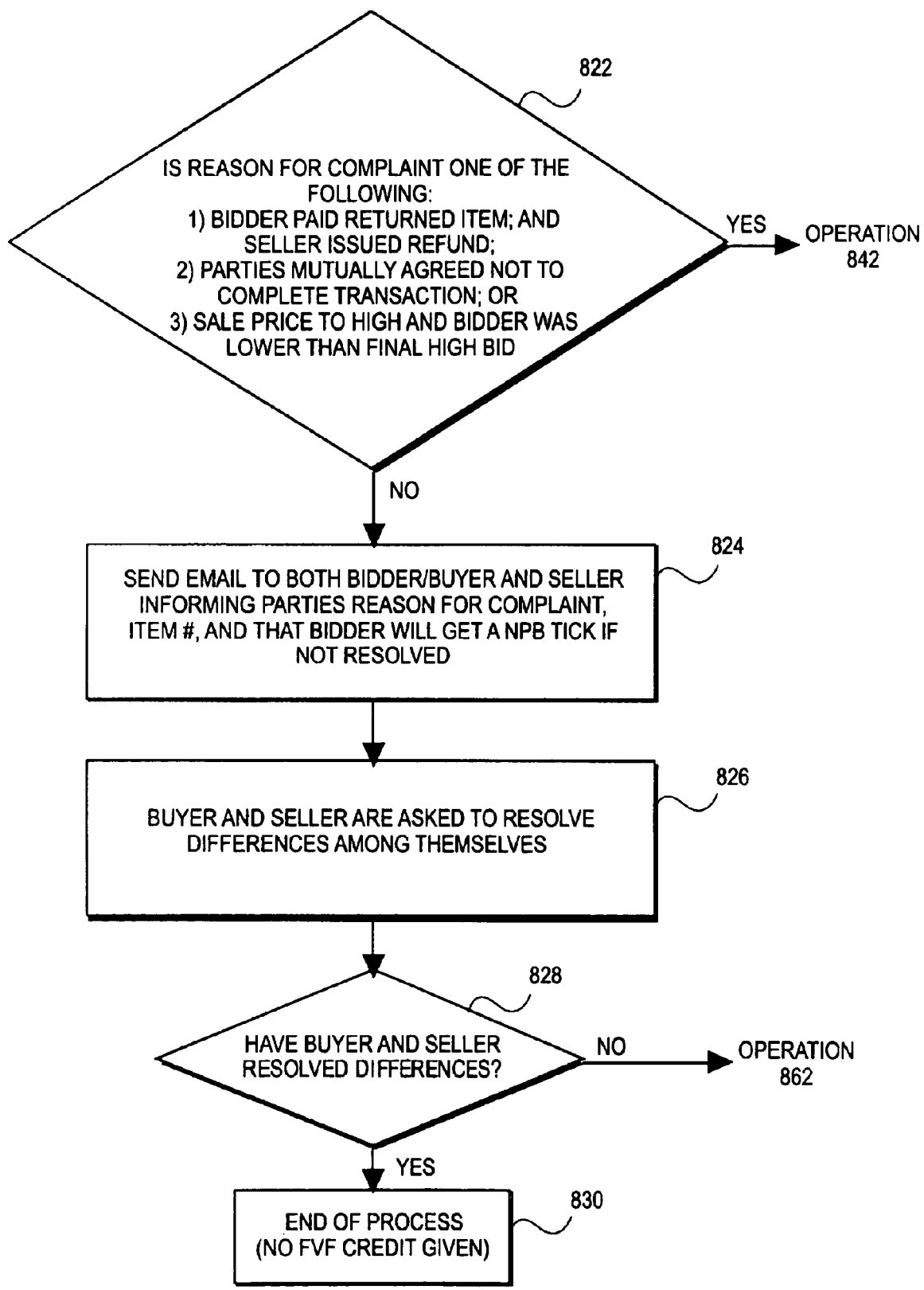

Referring to FIG. 8B, at operation 822 a determination is made if the reasons for the complaint are at least one of the following:

1) Bidder paid, returned item and seller issued a refund;
2) The parties mutually agreed not to complete the transaction; or
3) Sale price too high and bidder bid price was lower than final high bid.

Figure 8C:
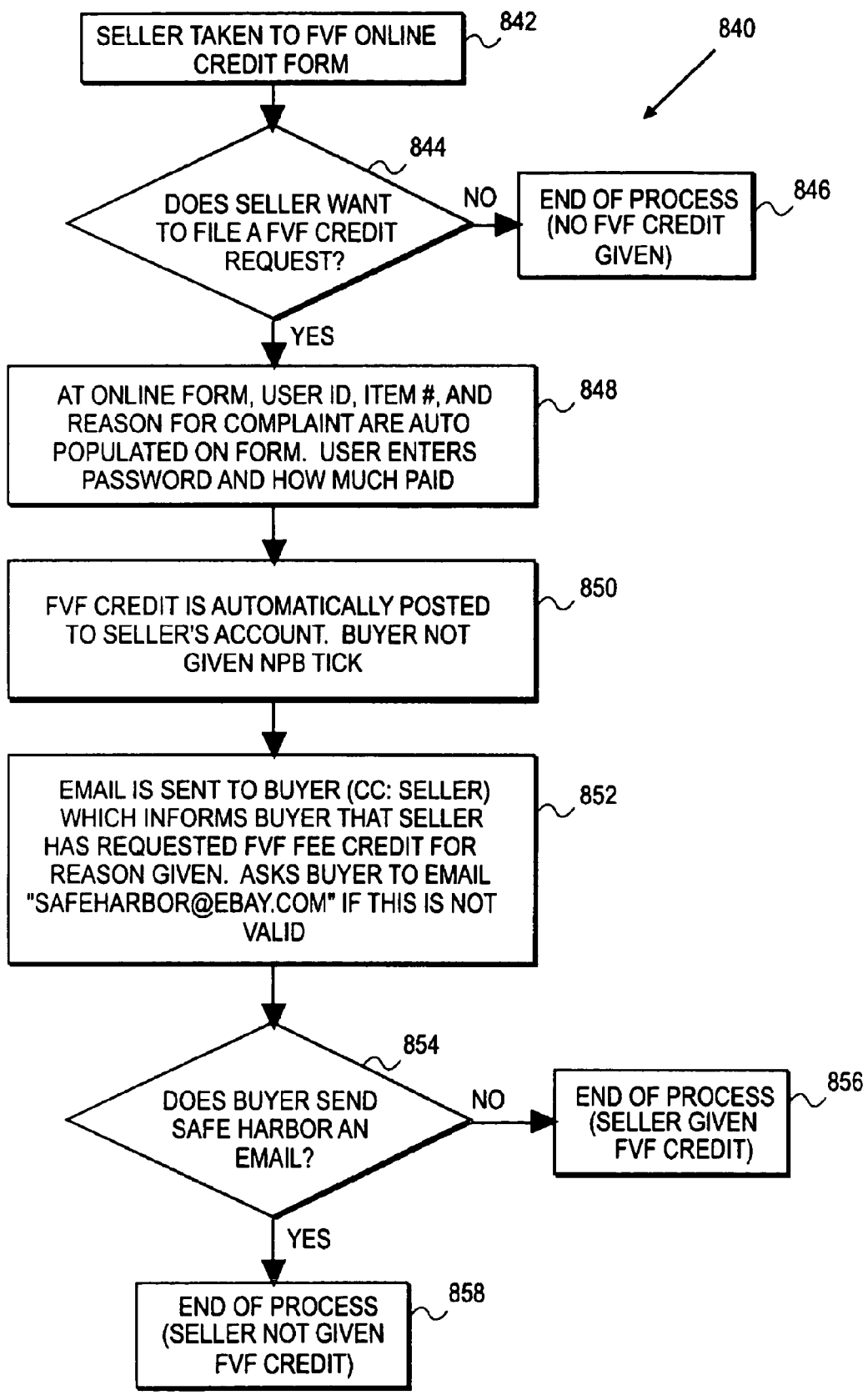

If the reasons for the complaint are at least one of the above reasons, operation 800 continues at operation 842 in FIG. 8C. If not, operation 800 continues to operation 824.

At operation 824, an email is sent to both bidder/buyer and seller informing the parties of the reason for complaint, item number, and that the bidder will get a NPB tick if the complaint is not resolved. The buyer is informed that the seller has filed a complaint. If the buyer believes the seller has made false statements, the buyer can inform the network-based transaction facility 110. For example, the buyer can send an email to a "safeharbor" within the network-based transaction facility 110.

At operation 826, the buyer and seller are asked to resolve differences among themselves. This notification can be a separate email or contained in the email of operation 824. For one implementation, the email to the NPB can encourage the buyer to leave negative feedback for the seller if the buyer responded during the mediation period and the seller did not respond and is now filing a FVF credit request.

At operation 828, a determination is made if the buyer and seller have resolved their differences (e.g., completed the transaction and/or satisfied obligations imposed by a transaction agreement). If the parties have not resolved their differences, operation 800 continues to operation 862 in FIG. 8D. If the parties have resolved their differences, at operation 830 the process ends. The seller cannot file a FVF refund request because the transaction has been completed and no FVF credit is given. Furthermore, the buyer is not given a NPB tick.

Filing a Final Value Fee Refund Request

Referring to FIG. 8C, if the reason for filing the complaint is one of the reasons stated in operation 822 of FIG. 8B, operation 800 continues to operation 842. At operation 842, the seller is taken to an FVF online credit form such as that shown in interfaces 1102, 1108, or 1120 of FIGS. 11A through 11C. For one implementation, the seller is not allowed to file a FVF credit until at least 10 days have passed since the seller filed the NPB complaint. Furthermore, the FVF credit request cannot be made more than 60 days after the end of auction.

At this point, the seller can request a FVF refund or credit because a transaction was not completed for valid reasons. At operation 844, a determination is made whether the seller wants to file a FVF refund or credit request. At operation 846, if the seller does not wish to file a FVF credit request, the seller can leave interfaces 1102, 1108, or 1120 and the process ends. If, however, the seller does wish to file a FVF credit request, operation 800 continues to operation 848.

At operation 848, the seller's user ID, item number, and reasons for complaint can be auto-populated on the online form. Alternatively, the seller can enter the aforementioned information as shown in windows 1104 and 1106 in FIG. 11A. The seller can then enter his/her password and how much was paid for the item in windows 1104 and 1110, 1122, and 1124 as shown in FIGS. 11A through 11C.

At operation 850, the FVF credit is automatically posted to seller's account. The buyer is not given a NPB tick because there was a valid reason on why the transaction was not completed. At operation 852, an email is sent to the buyer (cc: Seller) to inform the buyer that the seller has requested a FVF credit for the reasons given. The buyer is asked to email the "safeharbor" if this is not valid. For example, if the buyer did complete the transaction, then the seller is fraudulently requesting a FVF refund.

At operation 854, a determination is made if the buyer has sent an email to the "safeharbor." If an email was not sent, at operation 856, the process ends and the seller is given a FVF credit. If the buyer does send an email to the "safeharbor", at operation 858, the seller is not given a FVF credit and the process ends. Here, a further determination can be made by the network facility to inquire about the validity of the buyer's and seller's statements.

Filing a Non-Paying Bidder Appeal

Figure 8D:
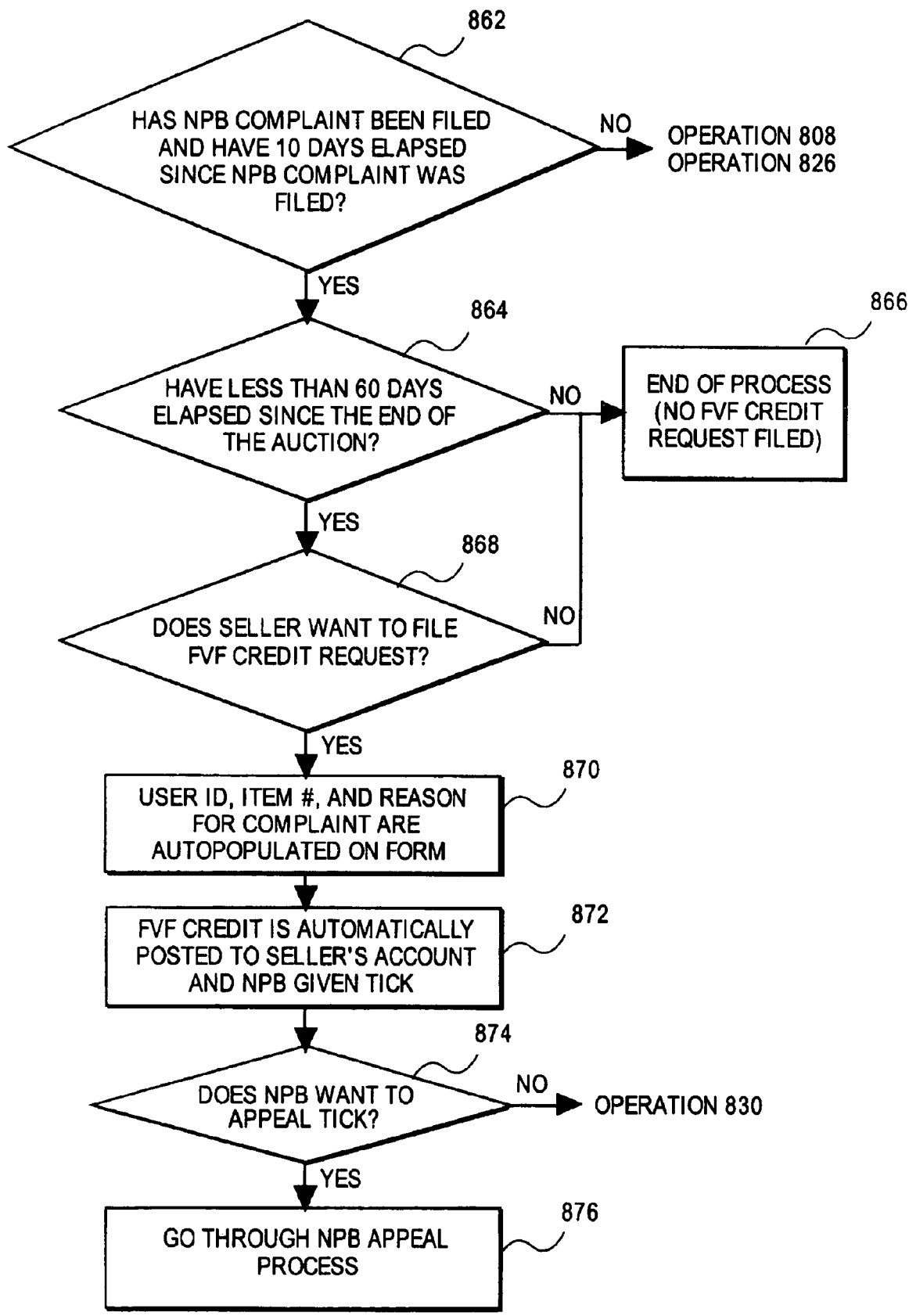

Referring to FIG. 8D, at operation 862, a determination is made if a NPB complaint has been filed and if a predetermined time period (e.g., 10 days) has elapsed since the NPB complaint was filed. If the complaint has been filed and if 10 days have not elapsed, operation 800 continues to operation 826. Otherwise, operation 800 continues to operation 808.

If a NPB complaint has been filed and 10 days or more have elapsed, operation 800 continues to operation 864. At operation 864, a determination is made if less than a predetermined time period (e.g., 60 days) has elapsed since the end of the auction. If more than 60 days have elapsed, at operation 866, operation 800 ends and no FVF credit request is filed. Here, approximately two months have passed since the auction, which exceeds a maximum time limit to file a FVF credit request.

If less than 60 days have elapsed since the end of the auction, at operation 868, a determination is made if the seller wants to file a FVF credit request. If the seller does not want to file a FVF credit request, operation 800 ends at operation 866. If the seller does want to file a FVF credit request, at operation 870, the seller is taken to the FVF online credit form such as that shown in interfaces 1102, 1108, or 1120 of FIGS. 11A through 11C. For one embodiment, the user ID, item no., and reason for the complaint are autopopulated on the FVF online form.

At operation 872, after the seller completes the FVF online form, the FVF credit is automatically posted to the seller's account and a NPB tick is given to the NPB. For example, the seller's account can be credited within 24 hours of a FVF credit request being filed. The NPB is notified via email that a tick has been given and is given the opportunity to appeal the tick.

At operation 874, a determination is made if the NPB wants to appeal the tick. If the NPB does not want to appeal the tick, operation 800 continues to operation 830. If the NPB does want to appeal the tick, the NPB is taken to an online NPB appeal form such as interface 1202 shown in FIG. 12.

At interface 1202, the NPB is given a window 1204 to enter a user ID and password and a window 1206 to enter the item number. Interface 1202 also provides a window 1208 for the NPB to enter a message on why the tick should not be given to him. After the NPB completes the NPB appeal form, the network-based facility can give the NPB a confirmation such as interface 1302 shown in FIG. 13. Furthermore, the seller and NPB can access an interface 1402 shown in FIG. 14 to determine number of credit requests and NPB tick scores for users.

For one embodiment, the NPB is given a maximum number of ticks (e.g., 3 ticks) before the NPB is suspended from participating in online auctions. If the NPB tick goes from 3 to 2, the NPB can be reinstated. If the FVF credit for the seller is reversed, the NPB tick can later be reversed and the tick can be removed. For another embodiment, the NPB must receive at least three NPB ticks from three different sellers before that bidder is automatically suspended. If, for example, a bidder receives three NPB ticks from Seller A and one NPB tick from Seller B, the bidder should not be automatically suspended (NPB tick score=2). However, the bidder should be flagged so that the operator of the network-based transaction facility may manually review the bidder and have the ability to suspend the bidder.

Submission of Complaints Between Parties

FIG. 15 is a diagrammatic representation of an exemplary embodiment of a transaction record table that is populated with records or entries for disputes and requests. Such a transaction record table may be stored in the disputes and requests table 282 of FIG. 2.

FIG. 15 is a diagrammatic representation of an exemplary disputes and requests table 1500 of the database illustrated in FIG. 2. For example, the dispute and requests table may store information relating a dispute caused by failed transactions.

Referring to FIG. 15, the disputes and requests table 1500 includes a type column 1505, a counterparty column 1510, a transaction identifier column 1515, a date column 1520, an amount column 1525, a reason column 1530, a filed on column 1535, a status column 1540, and an action column 1545.

The type column 1505 stores the type of dispute. The counterparty column 1510 stores a name of a counter party to the dispute. The transaction identifier column 1515 stores an identifier of the transaction record that is in dispute. The date column 1520 stores the date of the transaction in dispute. The amount column 1525 stores an amount of the transaction in dispute. The reason column 1530 stores a reason for the dispute. Examples of entries to be stored in the reason column 1530 include unauthorized, non-receipt, merchandise, duplicate, or other.

The filed on column 1535 stores the date the dispute was filed. The status column 1540 stores an indicator of the status of the dispute. For example, the entry stored in the status column 1540 may include "case closed," "waiting for your response," (which indicates when the dispute is waiting for a response from the accused party), and "reviewing your response," (which indicates when the dispute is in a review workflow state). The action column 1545 stores an indication of an action to be performed by one of the parties to the transaction, such as "resolved" or "cancel."

Figure 16A:
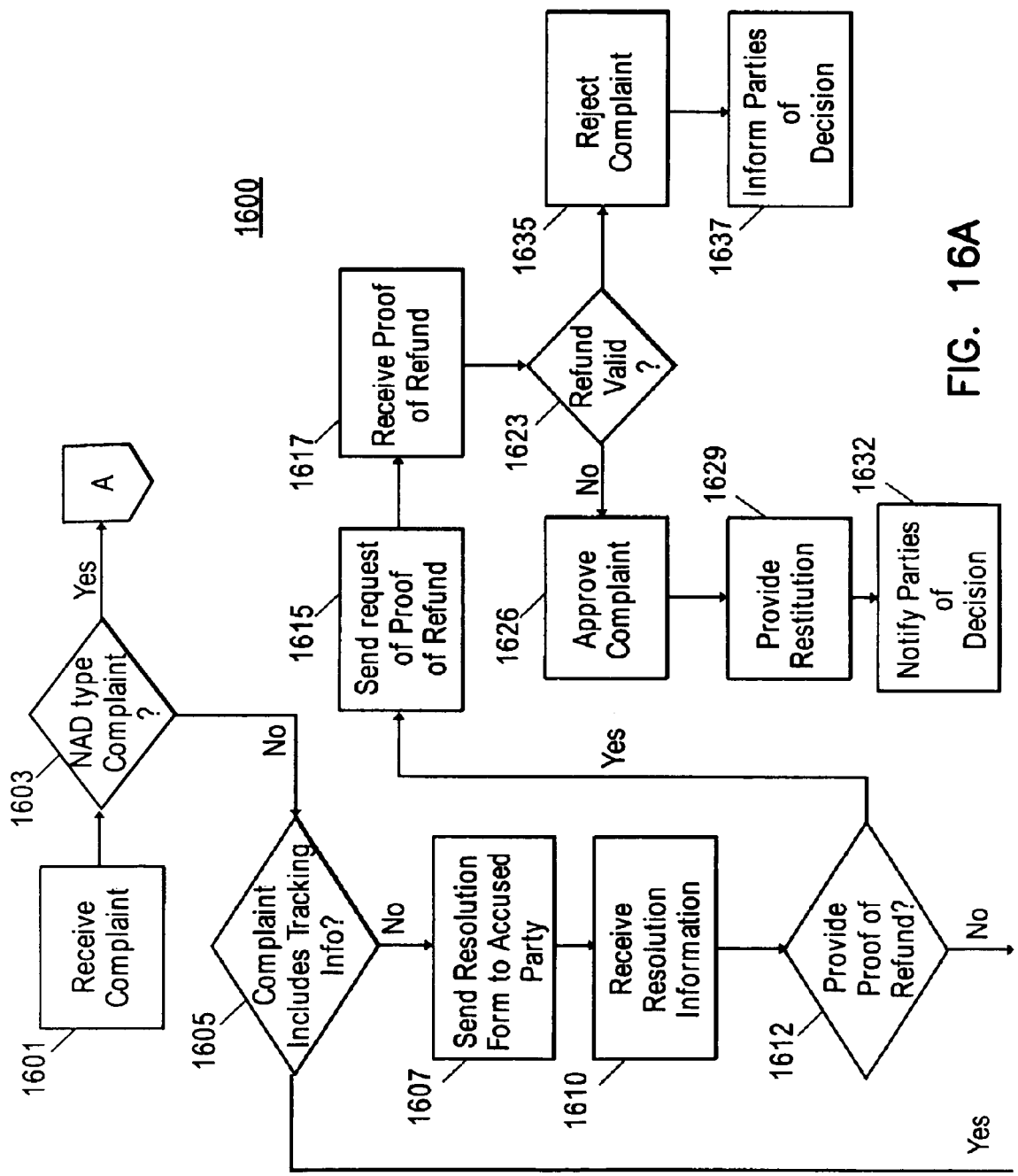
FIGS. 16A and 16B are flow charts illustrating an exemplary operation for a network-based facility to resolve disputes without agent intervention.

FIG. 16 is a flow chart illustrating an exemplary dispute resolution process flow 1600 for a network-based facility to resolve disputes without agent intervention. The following exemplary operation may utilize the record table of FIG. 15 and other information contained in the database as shown in FIG. 2.

Referring to FIG. 16, for purposes of explanation, the dispute resolution process flow 1600 begins at block 1601 after an end of an auction.

At block 1601, the network-based transaction facility 110 receives a complaint from a party (e.g., a complaining party) to a transaction. For example, the network-based transaction facility 110 may receive a complaint from a buyer related to a transaction in dispute between the buyer and seller. For instance, the buyer may submit a complaint regarding a purchased item that has not been received from a seller related to the transaction.

In one embodiment, the complaint includes complaint information. The complaint information may include an identifier of the counter party (e.g., an accused party) to the dispute, the transaction identifier of the transaction in dispute, the date of the transaction, the amount of the transaction, the reason for the complaint, and the date the complaint was filed. The complaint information may be stored in the open dispute and request table 1500 as described above.

Figure 17:
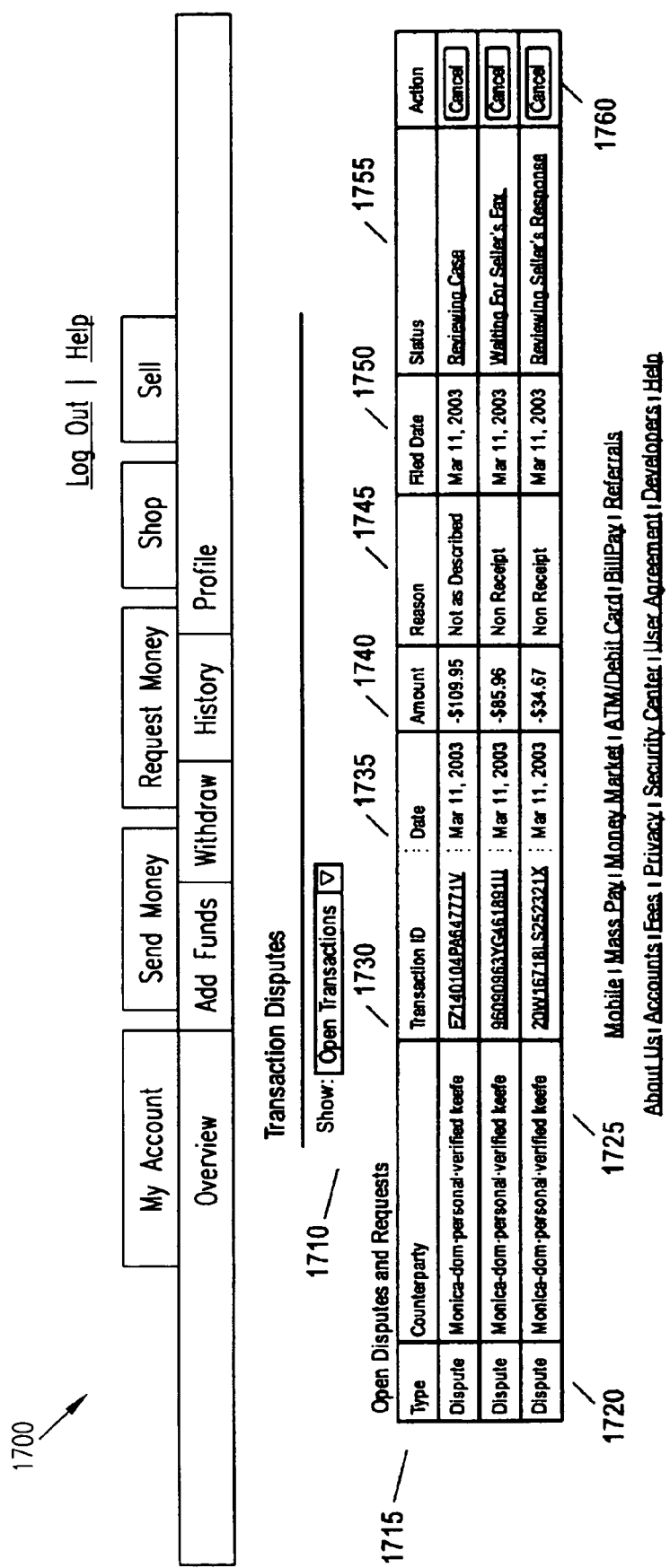
FIG. 17 illustrates one embodiment of a transaction disputes view.

Upon submitting the complaint, the complaining party may view the complaint via the network-based transaction facility 110. For example, FIG. 17 illustrates one embodiment of a transaction disputes view 1700. The transaction disputes view 1700 includes a show list box 1710 and a disputes table 1715. The show list box 1710 toggles the types of transactions to be displayed in the disputes view 1700.

The disputes table 1715 includes a type column 1720, a counterparty column 1725, a transaction ID column 1730, a date column 1735, an amount column 1740, a reason column 1745, a filed on column 1750, a status column 1755, and an action column 1760.

The type column 1720 displays the type of dispute. The counterparty column 1725 displays an identifier of the counterparty to the dispute. The transaction ID column 1730 displays an identifier of the transaction in dispute. In one embodiment, upon selecting a specific transaction ID, the user is shown additional details relating to the transaction in dispute.

The date column 1735 displays the date of the transaction in dispute. The amount column 1740 displays the amount in dispute. The reason column 1745 displays a brief reason for the complaint. The filed on column 1750 displays the date the complaint was received by the network-based transaction facility 110. The status column 1755 displays the current status of the complaint. In one embodiment, upon selecting a specific status indicator, the user is shown a chargeback details view relating to the complaint. For example, FIG. 18 illustrates one embodiment of a chargeback details view 1800. The action column 1760 displays an action that may be performed by the party that submitted the complaint. For example, the complaining party may select to cancel a complaint of a specific transaction in dispute. The complaining party may cancel a submitted complaint for a variety of reasons, such as, having received the auctioned item, having received a refund or receiving a payment, for the item, among other reasons. Upon expressing an interest to cancel the complaint, the network-based transaction facility 110 may also prompt the complaining party to acknowledge that the related complaint has been satisfactorily resolved and the network-based transaction facility 110 may express to the complaining party that further investigation will cease and the status of the complaint will be set to "closed" immediately.

At block 1603, the network-based transaction facility 110 determines whether the complaint is a 'Not As Described' (NAD) type complaint. In one embodiment, a NAD complaint indicates the buyer has received a purchased item that was not as described, for example, in an online listing for the item. If the complaint is a NAD type complaint, control passes to block 2503. If the complaint is not a NAD type complaint, control passes to block 1605.

At block 1605, the network-based transaction facility 110 determines whether the complaint includes tracking information for the shipped item. If the complaint includes tracking information, control passes to block 1650. If the complaint does not include tracking information, control passes to block 1607.

Figure 19:
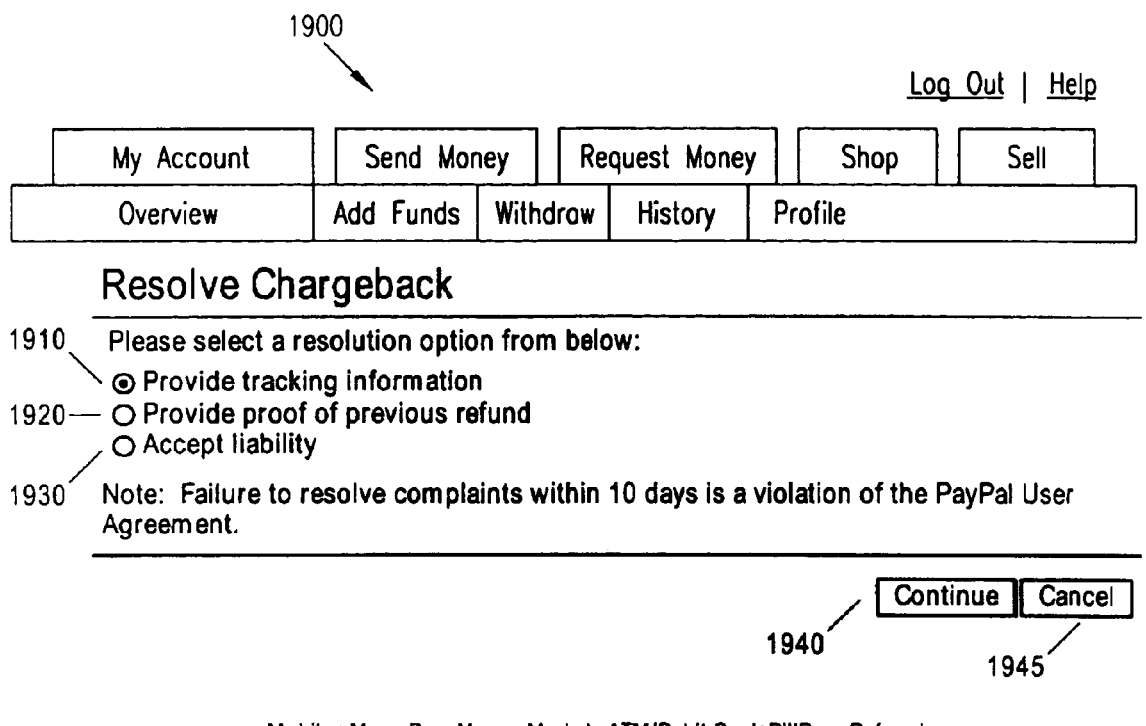
FIG. 19 illustrates one embodiment of a resolution form.

At block 1607, the network-based transaction facility 110 sends a request for resolution information, in the exemplary form of a resolution form, over the network to a second party to the transaction. The automatic submission of the resolution form allows an accused party to answer or appeal the submitted complaint. For example, FIG. 19 illustrates one embodiment of a resolution form 1900. The resolution form 1900 includes radio buttons which the accused party may select from to resolve the dispute. Radio button 1910 indicates the accused party may provide tracking information relating to the dispute. Radio button 1920 indicates the accused party may provide proof of previous refund. Radio button 1930 indicates the accused party accepts liability. Upon selecting one of the radio buttons 1910, 1920, or 1930, the accused party may select the continue button 1940 to submit a resolution response back to the network-based transaction facility 110. Alternatively, the party may select the cancel button 1945 to not submit a resolution response.

At block 1610, the network-based transaction facility 110 receives the requested resolution information (or response) over the network from the accused party.

At block 1612, the network-based transaction facility 110 determines whether the accused party selects to resolve the dispute by providing proof of a refund. If the proof of refund was indicated, control passes to block 1615. If the proof of refund was not indicated, control passes to block 1640.

Figure 21:
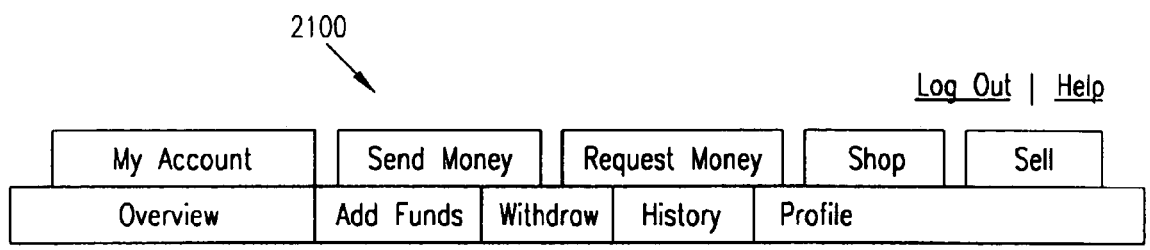
FIG. 21 illustrates one embodiment of a get refund transaction ID view.

At block 1615, the network-based transaction facility 110 sends a request for proof of the refund to the accused party. For example, FIG. 20 illustrates one embodiment of a provide proof of refund view 2000. The provide proof of refund view 2000 includes a radio button 2010 and a radio button 2020. Selecting the radio button 2010 and the continue button 2030 indicates the refund was issued via the network-based transaction facility 110 whereby the network-based transaction facility 110 submits a request for a refund transaction identifier for display by the accused party. For example, FIG. 21 illustrates one embodiment of a provide proof of refund view 2100. The provide proof of refund view 2100 includes a refund transaction ID field 2110. The refund transaction ID field 2110 prompts the accused party to provide the transaction identifier associated with the refund.

Referring again to FIG. 20, selecting the radio button 2020 and the continue button 2030 indicates the refund was issued via a facility other than the network-based transaction facility 110, whereby a request for an alternative means of proof of refund is requested from the accused party. For example, FIG. 22 illustrates one embodiment of a provide alternate proof of refund information view 2200 that prompts the accused party to provide any details of the refund transaction, such as the name of the financial institution that provided the funds, an account name of the account from which the funds were obtained, a refund transaction identifier, etc. This information may be provided via a web form (not shown), via fax, via electronic mail (including an attached electronically scanned document), among other examples well known to those of ordinary skill in the art.

At block 1617, the network-based transaction facility 110 receives the proof of refund information.

At block 1623, the network-based transaction facility 110 confirms the proof of refund. For example, the network-based transaction facility 110 may confirm a refund issued via the network-based transaction facility 110 is valid by comparing the received proof of refund information with the records stored on the network-based transaction facility 110. Also, if the refund was issued with a facility other than the network-based transaction facility 110, the network-based transaction facility 110 may automatically or manually validate the refund information with a third party, such as a third party financial institution. If the refund is validated, control passes to block 1635. If the refund is not validated, control passes to block 1626.

At block 1626, the network-based transaction facility 110 approves the complaint. For example, the network-based transaction facility 110 may determine the complaint is valid and rejects the accused contention that a refund was made.

At block 1629, the network-based transaction facility 110 provides restitution to the complaining party. For example, the network-based transaction facility 110 may facilitate a refund payment, facilitate a partial refund payment, facilitate a stop payment, or facilitate the completion of the transaction (e.g., facilitate performance, such as facilitate payment or facilitate the delivery of the auctioned item), etc. For instance, the network-based transaction facility 110 may facilitate the transfer of funds from an account associated with the accused party to provide restitution to the complaining party.

At block 1632, the network-based transaction facility 110 notifies the parties of the decision. For example, the network-based transaction facility 110 may email both parties of the decision in favor of the complaining party and the decision that the accused party is to provide restitution to the complaining party. The notification may also include information related to the resolution of the complaint.

Referring back to block 1635, the network-based transaction facility 110 rejects the complaint. For example, the network-based transaction facility 110 may determine the complaint to be invalid based on the proof of refund information received from the accused party.

At block, 1637, the network-based transaction facility 110 notifies the parties of the decision. For example, the network-based transaction facility 110 may email both parties of the decision in favor of the accused party and may also include information related to the resolution of the complaint.

Referring back to block 1640, the network-based transaction facility 110 determines whether the accused party selected to resolve the dispute by providing tracking information (e.g., a tracking number, shipping carrier being used, date shipped, destination address, current location, etc.). If tracking information has been received, control passes to block 1642. If tracking information has not been received, control passes to block 1680.

At block 1642, the network-based transaction facility 110 sends a request for tracking information to the accused party. For example, FIG. 23 illustrates one embodiment of a provide tracking information view 2300. The provide tracking information view 2300 includes a tracking number field 2310 and a shipping company field 2320. The tracking number field 2310 prompts the accused party to provide a shipping tracking number of the auctioned item in dispute. The shipping company field 2320 prompts the accused party to provide a name of a shipping carrier that shipped the auctioned item, such as United Parcel Service (UPS), United States Postal Service (USPS), Federal Express (FedEx), Airborne Express, DHL Worldwide Express, or among others.

At block 1645, the network-based transaction facility 110 receives the shipping tracking information from the accused party.

At block 1650, the network-based transaction facility 110 determines whether the shipping tracking information is valid. For example, the network-based transaction facility 110 may electronically determine whether the shipping tracking information is valid based an automatic comparison of the received shipping tracking information and the tracking information stored on a computer of the related shipping carrier over a network. If the tracking information is valid, control passes to block 1655. If the tracking information is not valid, control passes to block 1665. In one embodiment, an agent associated with the shipping information will manually confirm the shipping tracking information with the related shipping carrier via telephone, fax, electronic mail, among other communications mechanisms well known to those or ordinary skill in the art.

At block 1655, the network-based transaction facility 110 rejects the complaint. For example, the network-based transaction facility 110 may reject the complaint because a purchased item is in transit based on the received shipping tracking information.

At block 1660, the network-based transaction facility 110 notifies the parties of the decision. For example, the network-based transaction facility 110 may email both parties of the decision in favor of the accused party and the decision based on the evidence that the item has been shipped to the complaining party. The notification may also include information related to the resolution of the complaint, such as the tracking information and other resolution information.

At block 1665, the network-based transaction facility 110 approves the complaint. For example, the network-based transaction facility 110 may approve the complaint because there is no proof the purchased item was sent to the complaining party based on the received tracking information.

At block 1670, the network-based transaction facility 110 provides restitution to the complaining party. For example, the network-based transaction facility 110 may facilitate a refund payment, facilitate a partial refund payment, facilitate a stop payment, or facilitate the completion of the transaction (e.g., facilitate performance, such as facilitate payment or facilitate the delivery of the auctioned item), etc.

At block 1675, the network-based transaction facility 110 notifies the parties of the decision. For example, the network-based transaction facility 110 may email both parties of the decision in favor of the complaining party and the decision that the accused party is to provide restitution to the complaining party. The notification may also include information related to the resolution of the complaint.

Figure 24:
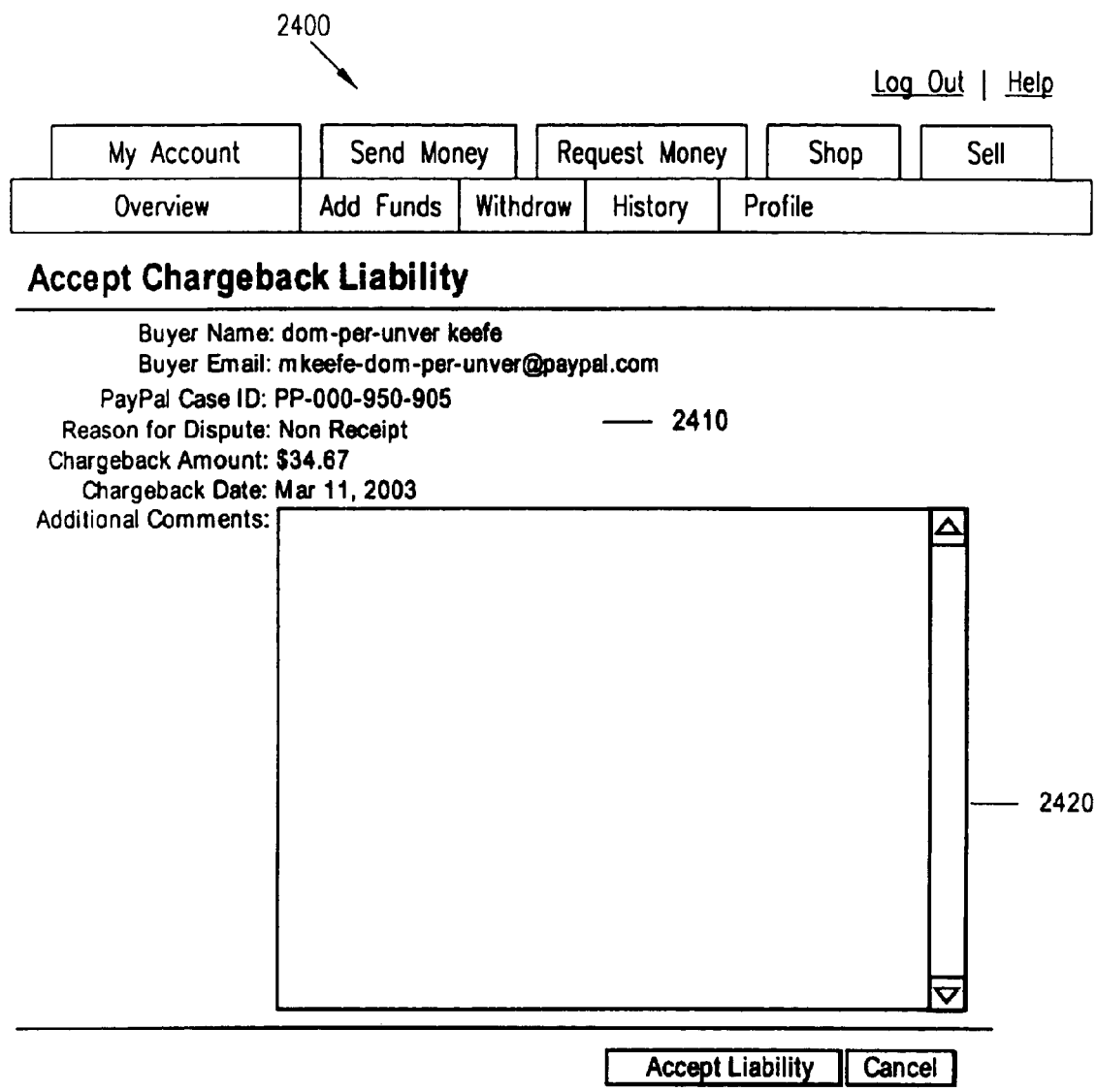
FIG. 24 illustrates one embodiment of an accept liability view.

Referring back to block 1680, the network-based transaction facility 110 sends a request to accept liability to the accused party of the dispute. In one embodiment the network-based transaction facility 110 sends the accused party an online form prompting the accused party for any additional details explaining the non-performance. For example, FIG. 24 illustrates one embodiment of an accept liability view 2400. The accept liability view 2400 displays information about the dispute 2410 and has an additional comments field 2420. The additional comments field 2420 prompts the accused party to provide comments for failing to perform the transaction.

At block 1682, the network-based transaction facility 110 receives the accept liability information related to the complaint.

At block 1684, the network-based transaction facility 110 approves the complaint based on the accused party's expressed acceptance of liability.

At block 1685, the network-based transaction facility 110 provides restitution to the complaining party. For example, the network-based transaction facility 110 may facilitate a refund payment, facilitate partial refund payment, facilitate a stop payment, or facilitate the completion of the transaction (e.g., facilitate performance, such as facilitate payment or facilitate the delivery of the auctioned item), etc.

At block 1690, the network-based transaction facility 110 notifies the parties of the decision. For example, the network-based transaction facility 110 may email both parties of the decision in favor of the complaining party and the decision that the accused party is to provide restitution to the complaining party. The notification may also include information related to the resolution of the complaint, such as the reasons for non-performance.

Figure 25A:
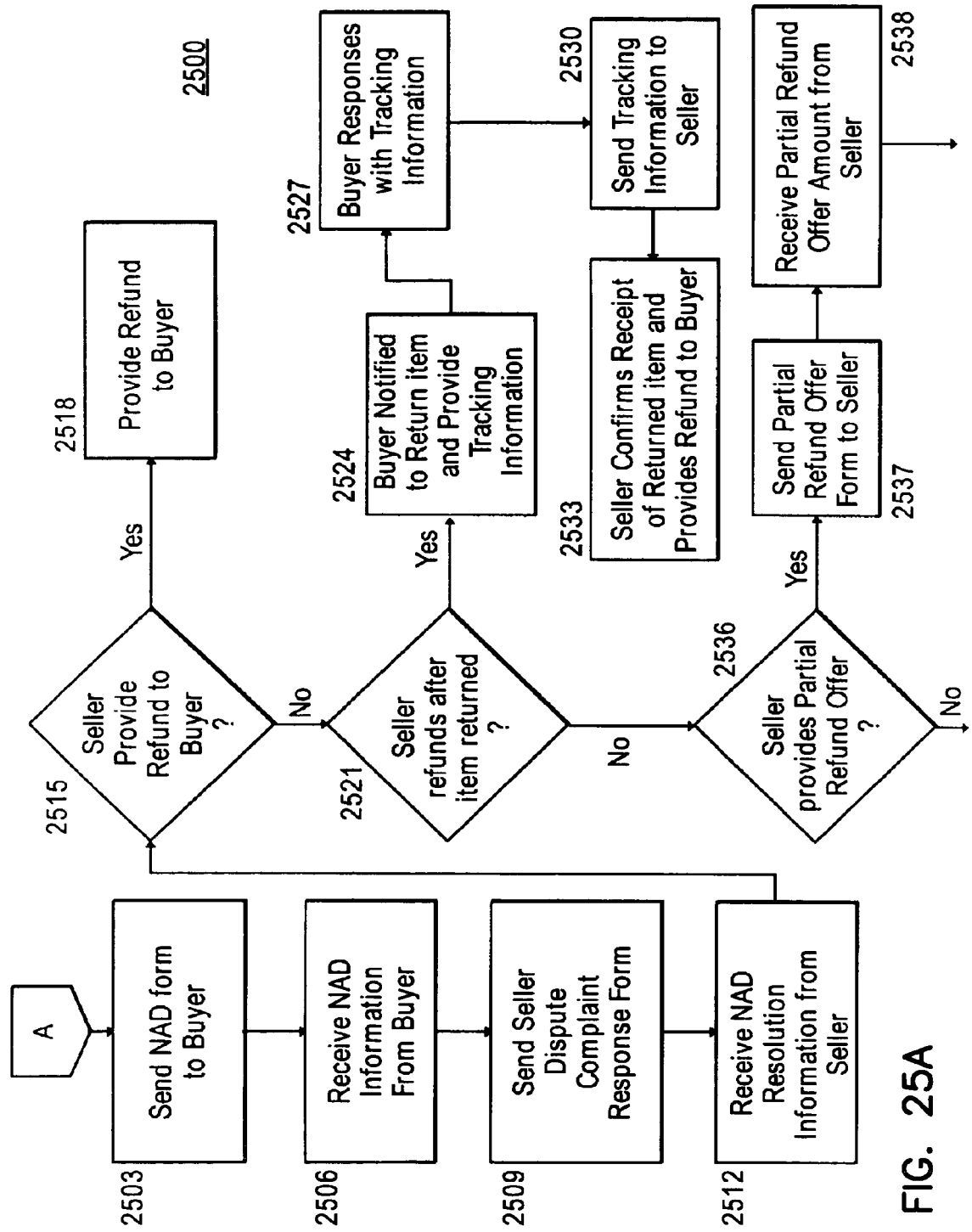
FIGS. 25A and 25B illustrate one embodiment of a NAD process flow in relation to the NAD type complaint.
Figure 25B:
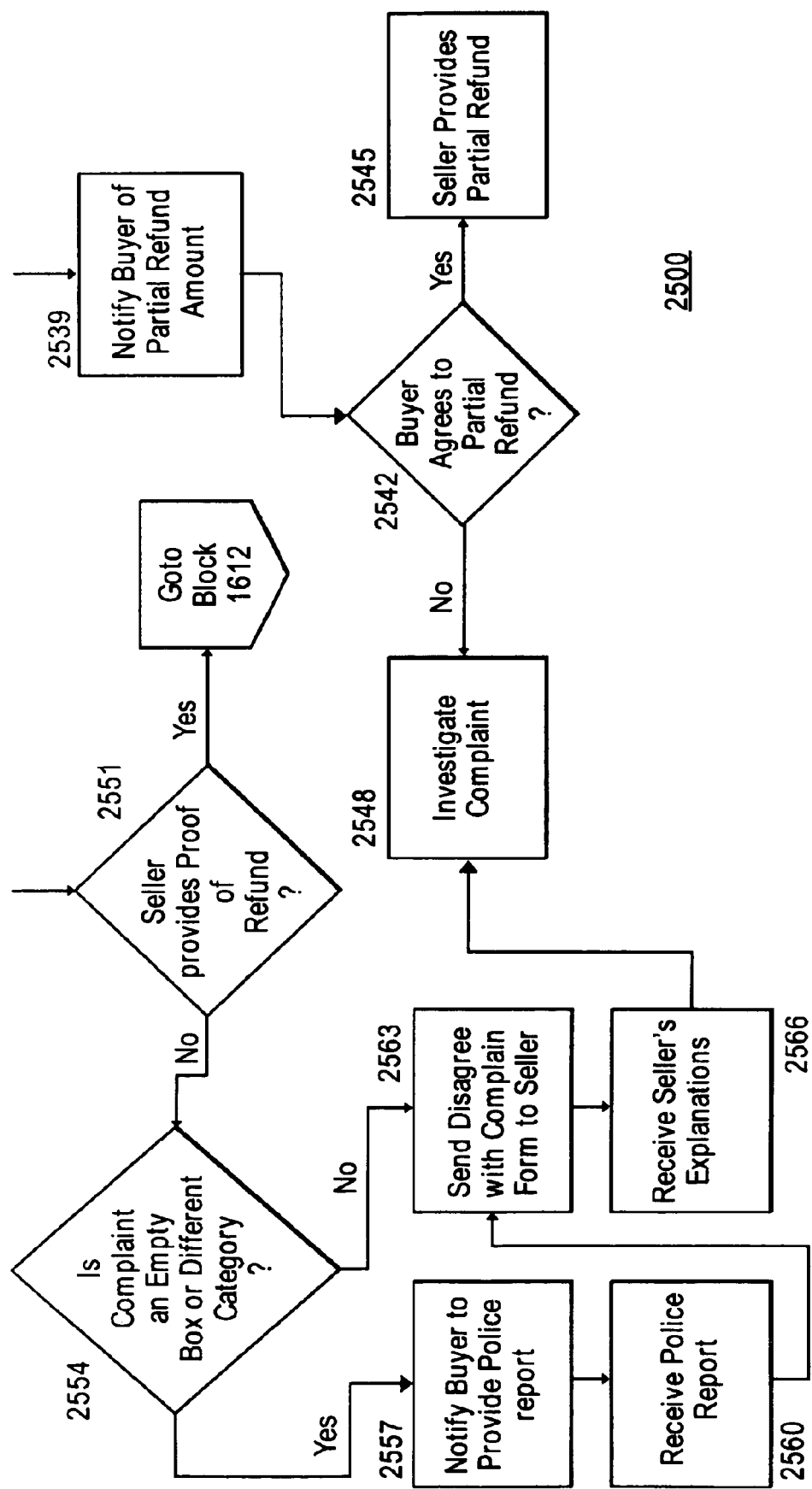

FIG. 25 illustrates one embodiment of a NAD process flow 2500 in relation to the NAD type complaint as described above in conjunction with block 1603.

At block 2503, the network-based transaction facility 110 sends a NAD form to the buyer. In one embodiment, an item is not as described if the seller misrepresents the item in a way that affects its value or usability. The NAD form enables the buyer to provide NAD information. For example, the NAD information may include information related to the condition of the purchase made by the buyer. FIG. 26 illustrates one embodiment of a NAD dispute form 2600. In one embodiment, the buyer may use the NAD dispute form 2600 to provide details about the condition of the purchase. For example, the buyer may select one or more of the following checkboxes to indicate the condition of the delivery item. For instance, the buyer may select checkbox 2605 to report the item arrived with missing parts that prevent the item from being used (e.g., no computer processor, no motor, etc.); select checkbox 2610 to report the item arrived with external damage to the item (e.g., scratches, cracks, chips, rips, dents, stains, odor, etc.); select checkbox 2615 to report the item arrived with a missing quantity (e.g., ordered 12 units but received 6, etc.); select checkbox 2620 to report the item arrived internally damaged (e.g., doesn't power on, doesn't play or plays with errors (DVD, CD, software, etc.); select checkbox 2625 to report the item arrived used when described as new (e.g., Original listing said it was "new" or "mint", etc.); select checkbox 2630 to report the item arrived with shipping cost issues (e.g., shipping cost more than expected, etc.); select checkbox 2635 to report the item arrived with sales tax issues (e.g., sales tax more than expected, etc.); select checkbox 2640 to report the item that arrived is a different model, version, or size (e.g., incompatible operating system (Microsoft Windows v. Macintosh), Motorcycle engine v. automobile engine, shoes too small to wear, etc.); select checkbox 2645 to report the item arrived with different design/pattern (e.g., floral v. striped, etc.); select checkbox 2650 to report the item that arrived is of a different category entirely (e.g., ordered a book, got a brick, etc.); select checkbox 2655 to report the item that arrived is of a different material (e.g., cotton v. silk, glass v. plastic, etc.); select checkbox 2660 to report the item that arrived is a less valuable substitute (e.g., less powerful (Intel Corporation Pentium 4 processor v. Pentium 3 processor), lower perceived quality (branded v. generic), etc.); select checkbox 2665 to report the time-sensitive item arrived late (e.g., concert tickets, etc.); select checkbox 2670 to report the item that arrived has a color difference (e.g., slight (light green v. dark green), moderate (green v. teal), serious (green v. red), etc.); select checkbox 2675 to report the item that arrived is ruined food/plants (e.g., spoiled, dead/weltered, etc.); select checkbox 2680 to report the item that arrived is a copy of an original (e.g., bootleg or pirated copy (music, movie, software, etc.); photocopy, etc.); select checkbox 2685 to report the item that arrived is an imitation (e.g., fake Rolex, fake Gucci purse, fake Armani suit, etc.); and/or select checkbox 2690 to report an empty box arrival (e.g., empty or contains unrelated material, etc.). Furthermore, the Form 2600 allows the buyer to provide additional details in the textbox 2695.

At block 2506, the network-based transaction facility 110 receives the NAD information from the buyer. NAD information may include, for example, information collected using the NAD dispute form 2600.

Figure 27:
FIG. 27 illustrates one embodiment of a Dispute Complaint Response form.

At block 2509, the network-based transaction facility 110 sends a Dispute Complaint Response Form to the seller. For example, FIG. 27 illustrates one embodiment of a resolve complaint form 2700 to obtain NAD resolution information from the seller. The resolve complaint form 2700 allows a seller to respond to the complaint. The resolve complaint form 2700 includes radio buttons that the seller may select to indicate a manner to resolve the dispute. A radio button 2710 enables the seller to indicate a willingness to issue the buyer a full refund to resolve the complaint. A radio button 2720 enables the seller to indicate a willingness to provide the buyer a full refund if the NAD item is returned in an attempt to resolve the complaint. A radio button 2730 enables the seller to indicate a willingness to offer the buyer a partial refund in an attempt to resolve the complaint. A radio button 2740 enables the seller to indicate that the buyer has already been refunded and a seller will provide proof of the refund. A radio button 2750 enables the seller to indicate disagreement with the complaint and to provide additional information.

At block 2512, the network-based transaction facility 110 receives the NAD resolution information from the Seller. At decision block 2515, the network-based transaction facility 110 determines whether the seller provided an indication to refund the buyer for the NAD item. If the seller provides an indication to refund the buyer, control passes to block 2518. If the seller did not provide an indication to refund the buyer, control passes to block 2521.

At block 2518, the network-based transaction facility 110 facilitates payment of the refund to the buyer. In one embodiment, the network-based transaction facility 110 may automatically transfer the appropriate refund amount from a financial account of the seller to a financial account of the buyer.

At block 2521, the network-based transaction facility 110 determines whether the seller provided an indication to refund the buyer after the NAD item is returned. If the seller provided an indication to refund the buyer after the NAD item is returned, control passes to block 2524. If the seller did not provide an indication to refund the buyer after the NAD item is returned, control passes to block 2536.

At block 2524, the network-based transaction facility 10 notifies the buyer to return the NAD item and provide the tracking information (e.g., tracking number, shipping carrier being used, date shipped, destination address, current location, etc.).

At block 2527, the network-based transaction facility 110 receives the tracking information from the buyer.

At block 2530, the network-based transaction facility 110 sends the tracking number to the seller.

At block 2533, the network-based transaction facility 110 receives confirmation from the seller of receipt of the NAD item and facilitates a refund to the buyer. In one embodiment, the network-based transaction facility 110 may automatically transfer the appropriate refund amount from a financial account of the seller to a financial account of the buyer.

At decision block 2536, the network-based transaction facility 110 determines whether the seller provided an indication to provide a partial refund to the buyer. If the seller provides an indication to negotiate a partial refund with the buyer for the NAD item, control passes to block 2537. If the seller does not provide an indication to negotiate a partial refund with the buyer for the NAD item, control passes to block 2551.

At block 2537, the network-based transaction facility 110 sends the seller a partial refunds form to the seller to obtain the partial refund amount offered by the seller to the buyer for the NAD item. In this fashion, both parties may negotiate a fair price for the item without human intervention. For example, FIG. 28 illustrates one embodiment of the Partial Refund Offer Form 2800. The partial refund offer form 2800 may include a transaction identifier (ID) field 2805, a name field 2810, an electronic mail (e-mail) field 2815, a total amount field 2820, a buyer's requested refund field 2825, a gross refund amount field 2830, a net refund amount field 2835, a fee refunded field 2840, a source of funds field 2845, a note to buyer field 2859, and ship to field 2855. The transaction identifier field 2805, the name field 2810, the electronic mail field 2815, the total amount field 2820 indicate the current transaction ID, name, e-mail address, and purchase amount of the transaction in dispute. If the buyer provides a refund amount to settle the dispute, for example, within the complaint, the buyer's requested refund will display in the buyer's requested refund field 2825. The seller may indicate a partial refund amount offer to resolve the complaint in the gross refund amount field 2830. If additional fees were related to the original complaint, the net refund and fee refunded are displayed in the net refund amount field 2835 and the fee refunded field 2840. The source of funds field 2845 may indicate to the seller which financial account the funds will be taken from. The seller may provide a message to buyer, for example, to help negotiate the partial refund offer, with the note to buyer field 2850. The ship to field 2855 allows the seller to indicate a mailing address to return the NAD item if the partial refund offer is rejected and, for example, is investigated as will be described.

At block 2538, the network-based transaction facility 110 receives the partial refund amount offer from the seller.

At block 2539, the network-based transaction facility 110 notifies the buyer of the partial refund amount offer. In this fashion, the buyer may decide whether to accept the partial refund amount. In one embodiment, the buyer may offer a counter-proposal, by which the seller and buyer may continue to negotiate a final partial refund amount.

At block 2542, the network-based transaction facility 110 receives the response to the partial refund offer amount from the buyer.

At decision block 2542, the network-based transaction facility 110 determines whether the buyer agrees to the partial refund offer. If the buyer agrees to the partial refund offer, control passes to block 2545. If the buyer does not agree to the partial refund offer, control passes to block 2548.

At block 2545, the network-based transaction facility 110 facilitates the payment of the partial refund to the buyer. In one embodiment, the network-based transaction facility 110 may automatically transfer the appropriate refund amount from a financial account of the seller to a financial account of the buyer; automatically prepare a check to be mailed to the buyer, etc.

Referring back to decision block 2551, the network-based transaction facility 110 determines whether the seller provided an indication to provide a proof of refund. If the seller provided an indication to provide a proof of refund, control passes to block 1612 and the process flow continues as described above. If the seller did not provide an indication to provide a proof of refund, control passes to block 2554.

At decision block 2554, the network-based transaction facility 110 determines whether the buyer indicated the reason for the NAD complaint is because of an empty box or a different category, for example as described above. If the complaint is for an empty box/different category, control passes to block 2557. If the complaint is not for an empty box/different category, control passes to block 2563.

At block 2557, the network-based transaction facility 110 requests the buyer to provide a copy of a police report regarding the empty box item or of a different category. In this fashion, for example, the submission of frivolous complaints may be reduced. In one embodiment, the network-based transaction facility 110 might also only require a police report if the cost of the item is greater than a predetermined amount (e.g., $200).

At block 2560, the network-based transaction facility 110 receives a copy of the police report. In one embodiment, the network-based transaction facility 110 receives a scan copy of the police report or a faxed copy of the police report.

Figure 29:
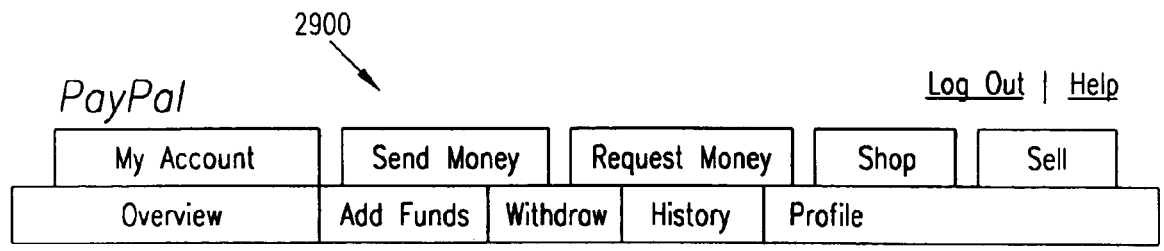
FIG. 29 illustrates a Disagree with Complaint Form.

At block 2563, the network-based transaction facility 110 sends a disagree with complaint form to the seller. For example, FIG. 29 illustrates a disagree with complaint form 2900. The seller may respond to each of the buyer's reasons for filing the complaint (2910, 2915) within a textbox (2930, 2935).

At block 2566, the network-based transaction facility 110 receives an explanation from the seller.

At block 2548, the network-based transaction facility 110 performs an investigation of the complaint. The network-based transaction facility 110 may perform the investigation automatically without human intervention, with human intervention, or a combination of both. Both parties will be notified of the results of the investigation. The investigation may determine to accept the complaint from the buyer and therefore, require the seller to refund the buyer. Alternatively, the investigation may determine to reject the complaint and end the investigation. In one embodiment, if the complaint is accepted, the buyer is required to return the item and provide tracking information (form not shown). After the network-based transaction facility 110 confirms the seller has received the returned item, the network-based transaction facility 110 will facilitate the refund of funds to the buyer. In one embodiment, the network-based transaction facility 110 may automatically transfer the appropriate refund amount from a financial account of the seller to a financial account of the buyer; prepare a check to be mailed to the buyer, etc.

In one embodiment, the network-based transaction facility 110 might also request additional information, as evidence, from which to base the decision, such as a certificate of authentication from a third party, a digital photo of the disputed item, affidavits from a third party regarding the disputed item, additional police reports, etc. This additional information may be provided to the network-based transaction facility 110 electronically or by other means.

In one embodiment, a third party agent may view the information related with each dispute within a view (not shown), including the complaint, response to the complaint, and negotiation of partial refund, etc. Furthermore, each complaint may be prioritized for view based on the transaction amount, language, a service level agreement, etc.

It should be understood that the process flows 1600 and 2500 are not limited to the blocks as described above. For example, the network-based transaction facility 110 may wait a predetermined amount of time for responses from the parties and/or remind parties to reply to requests for information within a predetermined amount of time. Furthermore, the network-based transaction facility 110 may automatically accept the complaint, reject the complaint, and/or facilitate the performance of restitution if a party to the transaction does not respond within a predetermined amount of time. For example, if the seller does not respond to a complaint within 10 days, the network-based transaction facility 110 will approve the complaint. However, longer wait periods may be necessary to accommodate international shipping times (e.g., 15 calendar days).

It should also be understood that the information exchanged in the process flows 1600 and 2500, as shown in FIGS. 16 and 25, may be stored as resolution information in a resolution information table of the database illustrated in FIG. 2.

Furthermore, it is understood that the notification of the buyer and seller as described above is not limited to using online forms, as described above. Rather, one of ordinary skill in the art will recognize additional mechanisms may be used to notify the parties including electronic mail, and text messaging, among other examples.

Exemplary Computing System

Figure 30:
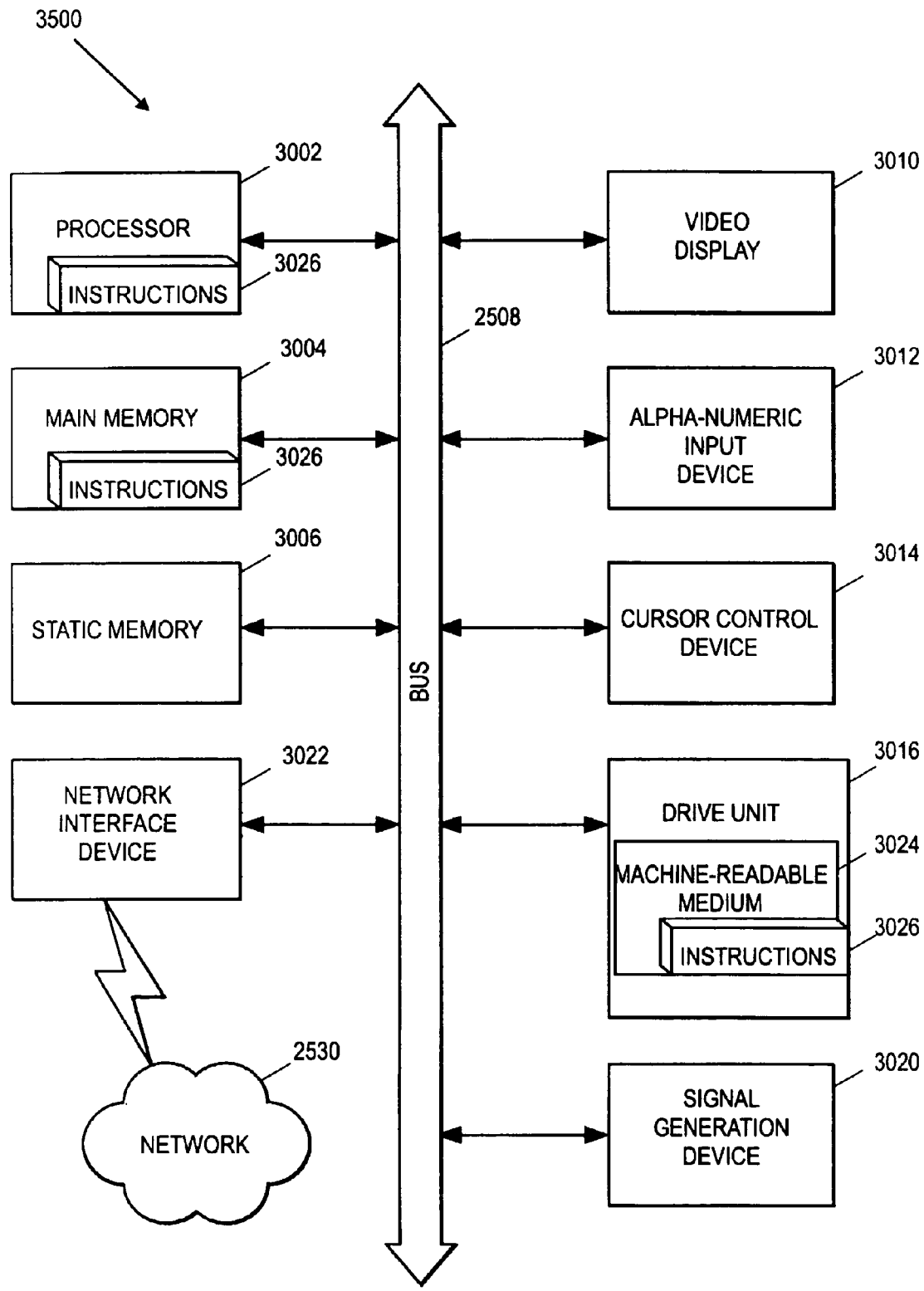
FIG. 30 is a diagrammatic representation of a machine, in an exemplary form of a computer system, in which a set of instructions for causing the machine to perform any of the methodologies of the present invention may be executed.

FIG. 30 is a diagrammatic representation of a machine, in an exemplary form of a computer system 3000, in which a set of instructions for causing the machine to perform any of the methodologies of the present invention may be executed. In alternative embodiments, the machine may comprise a network router, a network switch, a network bridge, a Personal Digital Assistant (PDA), a cellular telephone, a web appliance or any machine capable of executing a sequence of instructions that specify actions to be taken by that machine.

The computer system 3000 includes a processor 3002, a main memory 3004 and a static memory 3006, which communicate with each other via a bus 3008. The computer system 3000 may further include a video display unit 3010 (e.g., a liquid crystal display (LCD) or a cathode ray tube (CRT)). The computer system 3000 also includes an alpha-numeric input device 3012 (e.g., a keyboard), a cursor control device 3014 (e.g., a mouse), a disk drive unit 3016, a signal generation device 3020 (e.g., a speaker) and a network interface device 3022.

The disk drive unit 3016 includes a machine-readable medium 3024 on which is stored a set of instructions (i.e., software) 3026 embodying any one, or all, of the methodologies described above. The instructions 3026 is also shown to reside, completely or at least partially, within the main memory 3004 and/or within the processor 3002. The instructions 3026 may further be transmitted or received via the network interface device 3022. For purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not limited to, solid-state memories, optical disks, and magnetic disks.

It will be appreciated that more or fewer processes may be incorporated into the method(s) illustrated in FIGS. 8A, 8B, 8C, 8D, 16, and 25 without departing from the scope of the invention and that no particular order is implied by the arrangement of blocks shown and described herein. It further will be appreciated that the method(s) described in conjunction with FIGS. 8A, 8B, 8C, 8D, 16, and 25 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

The exemplary embodiments of the present invention have been discussed above within the context of a network-based transaction facility 110, which operates as a platform by which parties can establish an agreement to transact. It will, of course, be appreciated that the present invention is not limited to use within the context of such a trading platform, and may be deployed by any platform or service that is involved in a transaction. For example, the present invention could be deployed by a payment service that facilitates the transfer of funds between parties, a shipping service that is involved in the physical transport of products between parties or a services platform that allows one party to deliver a service to another party in exchange for value. The term "network-based transaction facility" should be construed to include a network-based trading platform, a payment service, a shipping service, or a services-delivery platform, for example.

Thus, a method and system for dealing with non-performing parties related to network-based transactions has been described. In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than in a restrictive sense.

What is claimed is:

1. A network based facility system that automatically resolves a subset of transaction disputes, said network based facility system comprising:
a computing system including a memory; and
a set of the computer instructions stored in said memory that, when executed by the computing system, cause the computing system to
receive a complaint over a network from a first party to a network-based transaction, the complaint being associated to the transaction, the first party being obligated to pay a transaction fee upon a completed transaction;
determine if said complaint is due to said transaction being cancelled upon mutual agreement between said first party and a second party;
send a request, if said first party indicated that said transaction was cancelled upon mutual agreement, over the network to said second party to the transaction requesting a notification if said transaction was not cancelled; and
provide restitution of said transaction fee automatically to the first party if no notification specifying that said transaction was cancelled is received from said second party.

2. The network based facility system as set forth in claim 1, wherein the restitution to the first party is a refund of funds to the first party.

3. The network based facility system as set forth in claim 1, wherein the restitution to the first party is a partial refund of funds to the first party.

4. The network based facility system as set forth in claim 1, wherein the restitution is automatically provided directly from a financial account related to the network based facility system to a financial account related to the first party.

5. The network based facility system as set forth in claim 1, wherein the process is further causes the computing system not to provide the restitution to the first party if said second party sends said notification specifying said transaction was not cancelled.

6. The network based facility system as set forth in claim 1, wherein the notification from said second party comprises an email message.

7. The network based facility system as set forth in claim 1, wherein the transaction is deemed cancelled upon mutual agreement between said first party and said second party if said second party returns a purchased item back to said first part and said first party issues a refund to said second party.

8. The network based facility system as set forth in claim 1, wherein the transaction is deemed cancelled upon mutual agreement between said first party and said second party if said second party did not have the high bid in an auction transaction.

9. The network based facility system as set forth in claim 1, wherein the second party is not penalized for not paying said first party.

10. A network based facility system, said network based facility comprising:
    means for receiving a complaint over a network from a first party to a transaction, the complaint being associated to the transaction, the first party being obligated to pay a transaction fee upon a completed transaction;
    means for determining if said complaint is due to said transaction being cancelled upon mutual agreement between said first party and a second party;
    means for sending a request, when said first party indicates that said transaction was cancelled upon mutual agreement, over the network to said second party to the transaction requesting a notification if said transaction was not cancelled; and
    means for providing restitution of said transaction fee to the first party if no notification specifying that said transaction was cancelled is received from said second party.

11. The network based facility system as set forth in claim 10, wherein the restitution to the first party is a refund of funds to the first party.

12. The network based facility system as set forth in claim 10, wherein the restitution to the first party is a partial refund of funds to the first party.

13. The network based facility system as set forth in claim 10, wherein the means for automatically providing restitution includes a means for automatically providing funds from a financial account related to the network based facility system direct to a financial account related to the first party.

14. The network based facility system as set forth in claim 10, wherein the notification from said second party comprises an email message.

15. The network based facility system as set forth in claim 10, wherein the transaction is deemed cancelled upon mutual agreement between said first party and said second party if said second party returns a purchased item back to said first part and said first party issues a refund to said second party.

16. The network based facility system as set forth in claim 10, wherein the transaction is deemed cancelled upon mutual agreement between said first party and said second party if said second party did not have the high bid in an auction transaction.

17. A method for resolving disputes in a network-based facility, the method comprising:
    receiving a complaint over a network from a first party to a transaction, the complaint being associated to the transaction, the first party being obligated to pay a transaction fee upon a completed transaction;
    responsive to receipt of the complaint, determining by a computer if said complaint is due to said transaction being cancelled upon mutual agreement between said first party and a second party to said transaction;
    sending a request, when said first party indicates that said transaction was cancelled upon mutual agreement, over the network to said second party to the transaction requesting a notification if said transaction was not cancelled; and
    providing restitution of said transaction fee to the first party if no notification specifying that said transaction was cancelled is received from said second party.

18. The method as set forth in claim 17, wherein the restitution to the first party is a refund of funds to the first party.

19. The method as set forth in claim 17, wherein the restitution to the first party is a partial refund of funds to the first party.

20. The method as set forth in claim 17, wherein the restitution is automatically provided directly from a financial account related to the network based facility system to a financial account related to the first party.

21. The method as set forth in claim 17, including not providing the restitution to the first party if said second party sends said notification specifying said transaction was not cancelled.

22. The method as set forth in claim 17, wherein the notification from said second party comprises an email message.

23. The method as set forth in claim 17, wherein the transaction is deemed cancelled upon mutual agreement between said first party and said second party if said second party returns a purchased item back to said first part and said first party issues a refund to said second party.

24. The method as set forth in claim 17, wherein the transaction is deemed cancelled upon mutual agreement between said first party and said second party if said second party did not have the high bid in an auction transaction.

25. The method as set forth in claim 17, wherein said method further comprises:
    accepting the complaint from the first party only upon determining the complaint is sent from the first party a predetermined time period after the associated transaction.

26. The method as set forth in claim 17, wherein the second party is not penalized for not paying said first party.

27. A machine-readable medium having instructions when executed by a machine for resolving disputes in a network-based facility, causes the machine to perform the steps comprising:
    receiving a complaint over a network from a first party to a transaction, the complaint being associated to the transaction, the first party being obligated to pay a transaction fee upon a completed transaction;
    responsive to receipt of the complaint, determining if said complaint is due to said transaction being cancelled upon mutual agreement between said first party and a second party to said transaction;
    sending a request, when said first party indicates that said transaction was cancelled upon mutual agreement, over the network to said second party to the transaction requesting a notification if said transaction was not cancelled; and providing restitution of said transaction fee to the first party if no notification specifying that said transaction was cancelled is received from said second party.

28. The machine-readable medium as set forth in claim 27, wherein the restitution to the first party is a refund of funds to the first party.

29. The machine-readable medium as set forth in claim 17, wherein the restitution to the first party is a partial refund of funds to the first party.

30. The machine-readable medium as set forth in claim 27, wherein the restitution is automatically provided directly from a financial account related to the network based facility system to a financial account related to the first party.

31. The machine-readable medium as set forth in claim 27, including not providing the restitution to the first party if said second party sends said notification specifying said transaction was not cancelled.

32. The machine-readable medium as set forth in claim 27, wherein the notification from said second party comprises an email message.

33. The machine-readable medium as set forth in claim 27, wherein the transaction is deemed cancelled upon mutual agreement between said first party and said second party if said second party returns a purchased item back to said first part and said first party issues a refund to said second party.

34. The machine-readable medium as set forth in claim 27, wherein the transaction is deemed cancelled upon mutual agreement between said first party and said second party if said second party did not have the high bid in an auction transaction.

35. The machine-readable medium as set forth in claim 27, wherein said method further comprises:
   accepting the complaint from the first party only upon determining the complaint is sent from the first party a predetermined time period after the associated transaction.

36. The machine-readable medium as set forth in claim 27, wherein the second party is not penalized for not paying said first party.

* * * * *

UNITED STATES PATENT AND TRADEMARK OFFICE
CERTIFICATE OF CORRECTION

| | |
|---|---|
| PATENT NO. | : 7,870,066 B2 |
| APPLICATION NO. | : 10/837224 |
| DATED | : January 11, 2011 |
| INVENTOR(S) | : Huey Lin et al. |

It is certified that error appears in the above-identified patent and that said Letters Patent is hereby corrected as shown below:

Title Page;

On the face page, in field (75), in "Inventors", in column 1, line 1, delete "Moutain" and insert -- Mountain --, therefor.

On page 3, item (56), under "Other Publications", in column 2, line 4, delete "Capabilty" and insert -- Capability --, therefor.

On page 3, item (56), under "Other Publications", in column 2, line 5, delete "Vechicles" and insert -- Vehicles --, therefor.

On page 3, item (56), under "Other Publications", in column 2, line 12, delete "4-17-0," and insert -- Apr. 17, 2009, --, therefor.

On page 3, item (56), under "Other Publications", in column 2, line 16, delete "95-28-09," and insert -- May 28, 2009, --, therefor.

Figure 16B:
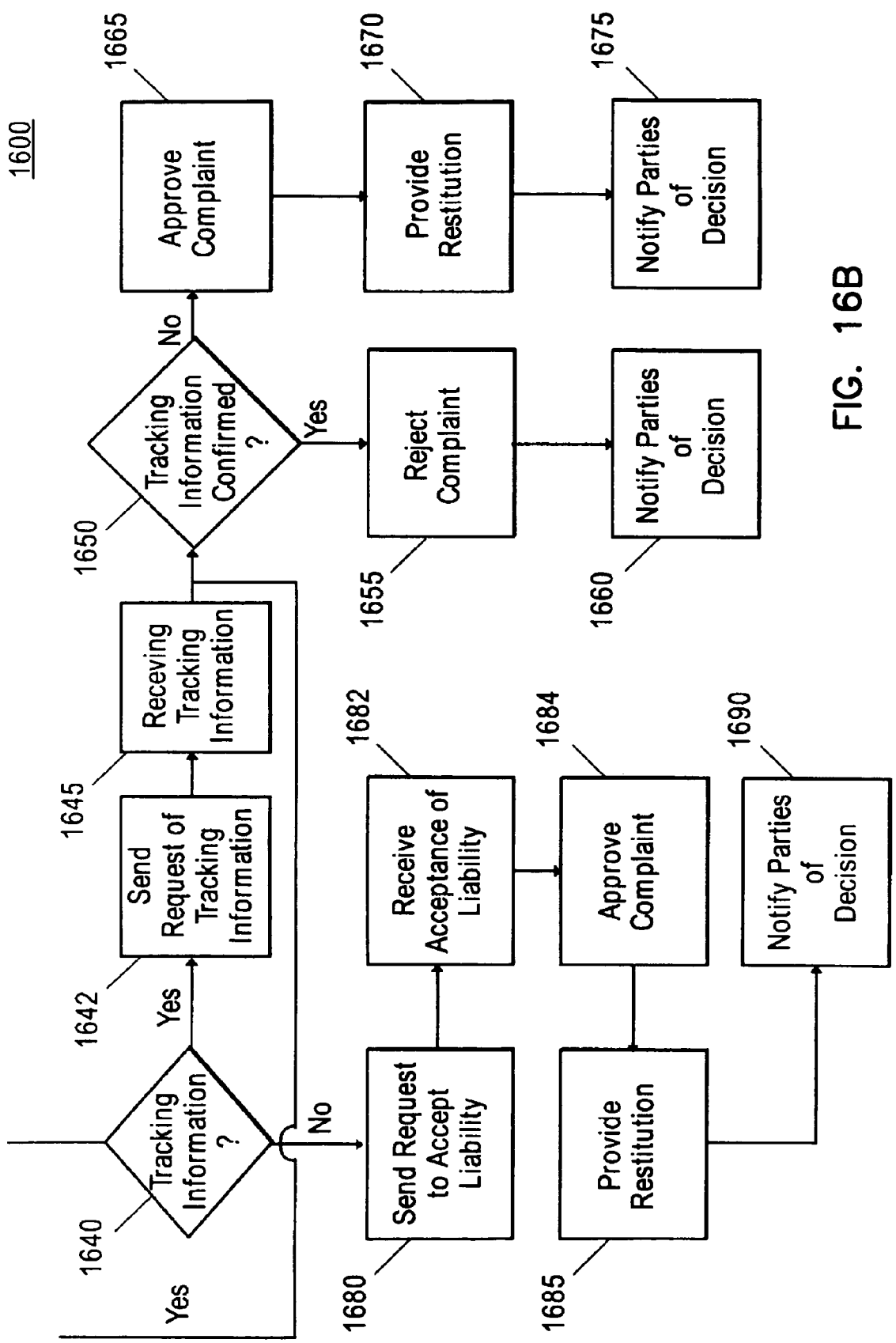

On Sheet 22 of 37, Reference Numeral 1645, Figure 16B, line 1, delete "Receving" and insert -- Receiving --, therefor.

In column 2, line 37, delete "FIGS. 1lA" and insert -- FIGS. 11A --, therefor.

In column 12, lines 40-44, Delete "FIG. 21 illustrates one embodiment of a provide proof of refund view 2100. The provide proof of refund view 2100 includes a refund transaction ID field 2110. The refund transaction ID field 2110 prompts the accused party to provide the transaction identifier associated with the refund." and insert the same on Col. 12 Line 39, after "example," as the continuation of the paragraph.

In column 16, line 45, delete "10" and insert -- 110 --, therefor.

Signed and Sealed this
Twenty-first Day of June, 2011

David J. Kappos
*Director of the United States Patent and Trademark Office*

CERTIFICATE OF CORRECTION (continued)
U.S. Pat. No. 7,870,066 B2

In column 21, line 17, in Claim 7, delete "part" and insert -- party --, therefor.

In column 21, line 62, in Claim 15, delete "part" and insert -- party --, therefor.

In column 22, line 37, in Claim 23, delete "part" and insert -- party --, therefor.

In column 24, line 5, in Claim 33, delete "part" and insert -- party --, therefor.